(12) United States Patent
Hande et al.

(10) Patent No.: US 12,047,266 B2
(45) Date of Patent: Jul. 23, 2024

(54) ROUND-TRIP TIME AS A LATENCY PERFORMANCE INDICATOR

(71) Applicant: QUALCOMM Incorporated, San Diego, CA (US)

(72) Inventors: Prashanth Haridas Hande, San Diego, CA (US); Nikolai Konrad Leung, San Francisco, CA (US); Peerapol Tinnakornsrisuphap, San Diego, CA (US); Dario Serafino Tonesi, San Diego, CA (US); Sebastian Speicher, Wallisellen (CH); Thomas Stockhammer, Bergen (DE); Mickael Mondet, Louannec (FR); Yih-Hao Lin, San Diego, CA (US); Ravi Agarwal, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/576,270

(22) Filed: Jan. 14, 2022

(65) Prior Publication Data
US 2023/0231788 A1    Jul. 20, 2023

(51) Int. Cl.
*H04L 43/08*        (2022.01)
*H04L 43/0817*      (2022.01)
(Continued)

(52) U.S. Cl.
CPC ...... *H04L 43/0864* (2013.01); *H04L 43/0817* (2013.01); *H04L 43/0882* (2013.01); *H04L 43/106* (2013.01); *H04W 28/0975* (2020.05)

(58) Field of Classification Search
None
See application file for complete search history.

(56) References Cited

U.S. PATENT DOCUMENTS

| | | | |
|---|---|---|---|
| 2015/0078171 A1* | 3/2015 | Gai | H04W 28/0268 370/237 |
| 2019/0215729 A1* | 7/2019 | Oyman | H04L 65/1016 |
| 2019/0288953 A1* | 9/2019 | Yavuz | H04W 28/0257 |

FOREIGN PATENT DOCUMENTS

WO    WO-2021188628 A1    9/2021

OTHER PUBLICATIONS

International Search Report and Written Opinion—PCT/US2022/081937—ISA/EPO—Mar. 27, 2023.

* cited by examiner

*Primary Examiner* — Peter Chen
*Assistant Examiner* — Jeff Banthrongsack
(74) *Attorney, Agent, or Firm* — Holland & Hart LLP/Qualcomm Incorporated

(57) ABSTRACT

Methods, systems, and devices for wireless communications are described. A wireless communications entity, such as a user equipment (UE), a base station, a network core, or an application server, may identify a round-trip time (RTT) latency requirement that may pertain to a round-trip latency in wireless communications between the UE and the base station. The wireless communications entity may identify a one one-way directional delay budget that satisfies the RTT latency requirement for an application of an application server. The application server may be in communication with the UE via the base station. The wireless communications entity may modify a value of the one-way directional delay budget and transmit a message that is associated with the modified value of the one one-way directional delay budget.

30 Claims, 13 Drawing Sheets

(51) Int. Cl.
*H04L 43/0864* (2022.01)
*H04L 43/0882* (2022.01)
*H04L 43/106* (2022.01)
*H04W 28/08* (2023.01)

ROUND-TRIP TIME AS A LATENCY PERFORMANCE INDICATOR

FIELD OF TECHNOLOGY

The following relates to wireless communications, including round-trip time (RTT) as a latency performance indicator.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). These communication devices may support latency sensitive applications, such as extended reality (XR) applications, in which increased latency may result in degraded user experience.

SUMMARY

The described techniques relate to improved methods, systems, devices, and apparatuses that support round-trip time (RTT) as a latency performance indicator. Generally, a wireless communications entity, such as a user equipment (UE), a base station, a network core, or an application server, may identify an RTT latency requirement that may pertain to a round-trip latency in wireless communications between the UE and the base station. The wireless communications entity may identify a one one-way directional delay budget that satisfies the RTT latency requirement for an application of an application server. The application server may be in communication with the UE via the base station. The wireless communications entity may modify a value of the one-way directional delay budget and transmit a message that is associated with the modified value of the one one-way directional delay budget. As a result, the wireless communications device may reduce latency in communications between the UE and a wireless communications network.

A method for wireless communication at a wireless communications entity is described. The method may include identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station, modifying a value of the at least one one-way directional delay budget for the wireless communications between the UE and the base station, and transmitting a message that is associated with the modified value of the at least one one-way directional delay budget.

An apparatus for wireless communication is described. The apparatus may include a processor, memory coupled with the processor, and instructions stored in the memory. The instructions may be executable by the processor to cause the apparatus to identify, at a wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station, modify a value of the at least one one-way directional delay budget for the wireless communications between the UE and the base station, and transmit a message that is associated with the modified value of the at least one one-way directional delay budget.

Another apparatus for wireless communication is described. The apparatus may include means for identifying, at a wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station, means for modifying a value of the at least one one-way directional delay budget for the wireless communications between the UE and the base station, and means for transmitting a message that is associated with the modified value of the at least one one-way directional delay budget.

A non-transitory computer-readable medium storing code for wireless communication at a wireless communications entity is described. The code may include instructions executable by a processor to identify, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station, modify a value of the at least one one-way directional delay budget for the wireless communications between the UE and the base station, and transmit a message that is associated with the modified value of the at least one one-way directional delay budget.

In some examples of the method, apparatuses, and non-transitory computer-readable medium described herein, identifying the RTT latency requirement and the at least one one-way directional delay budget may include operations, features, means, or instructions for receiving the RTT latency requirement from either the application server or from a network core that may be in communication with the application server.

In some examples of the method, apparatuses, and non-transitory computer-readable medium described herein, identifying the RTT latency requirement and the at least one one-way directional delay budget may include operations, features, means, or instructions for receiving a recommended uplink delay budget value and a recommended downlink delay budget value from either the application server or from the network core.

In some examples of the method, apparatuses, and non-transitory computer-readable medium described herein, modifying the value of the at least one one-way directional delay budget may include operations, features, means, or instructions for monitoring for traffic congestion in the wireless communications between the UE and the base station, reporting the traffic congestion to the network core, and receiving, from the network core, the modified value of the at least one one-way directional delay budget in the form of at least one of a modified recommended uplink delay budget or a modified recommended downlink delay budget.

In some examples of the method, apparatuses, and non-transitory computer-readable medium described herein, identifying the RTT latency requirement and the at least one one-way directional delay budget may include operations, features, means, or instructions for determining, based on the RTT latency requirement, an initial uplink delay budget value and an initial downlink delay budget value.

In some examples of the method, apparatuses, and non-transitory computer-readable medium described herein, modifying the value of the at least one one-way directional delay budget may include operations, features, means, or instructions for monitoring for traffic congestion in the wireless communications between the UE and the base station to determine whether the initial uplink delay budget value or the initial downlink delay budget value may be satisfied and determining, based on the traffic congestion, the modified value of the at least one one-way directional delay budget in the form of at least one of a modified uplink delay budget or a modified downlink delay budget.

In some examples of the method, apparatuses, and non-transitory computer-readable medium described herein, modifying the value of the at least one one-way directional delay budget may include operations, features, means, or instructions for receiving an uplink message from the UE, the uplink message associated with an uplink latency, where the base station may be the wireless communications entity, determining, based on the uplink latency and the RTT latency requirement, a time window for transmitting, responsive to the uplink message, a downlink message to the UE, and determining a downlink delay budget value that corresponds to the time window, where the downlink delay budget value may be a modified value of the at least one one-way directional delay budget.

Some examples of the method, apparatuses, and non-transitory computer-readable medium described herein may further include operations, features, means, or instructions for transmitting the downlink message to the UE during the time window and in accordance with the downlink delay budget value, where the downlink message may be the message that may be associated with the modified value of the at least one one-way directional delay budget.

In some examples of the method, apparatuses, and non-transitory computer-readable medium described herein, determining the time window for transmitting the downlink message to the UE may include operations, features, means, or instructions for identifying a first RTT for transmissions between the base station and a network core, receiving an indication of a second RTT for transmissions between the network core and the application server and a processing delay of the application server, or a combination of the second RTT and the processing delay, determining a back-end RTT range that may be based on the first RTT and the indication, and determining the time window based on the uplink latency, the back-end RTT range, and the RTT latency requirement.

In some examples of the method, apparatuses, and non-transitory computer-readable medium described herein, determining the time window based on the uplink latency, the back-end RTT range, and the RTT latency requirement may include operations, features, means, or instructions for setting the time window independently for each uplink message received at the base station during the wireless communications.

In some examples of the method, apparatuses, and non-transitory computer-readable medium described herein, setting the time window independently for each uplink message may include operations, features, means, or instructions for identifying a start time for the time window based on the uplink latency and a minimum value of the back-end RTT range and identifying an end time for the time window based on the uplink latency and a maximum value of the back-end RTT range.

In some examples of the method, apparatuses, and non-transitory computer-readable medium described herein, determining the downlink delay budget value that corresponds to the time window may include operations, features, means, or instructions for determining a minimum downlink delay budget value for the time window when multiple time windows for corresponding uplink messages overlap.

In some examples of the method, apparatuses, and non-transitory computer-readable medium described herein, setting the time window independently for each uplink message may include operations, features, means, or instructions for identifying a start time for the time window based on the uplink latency and a mean value of the back-end RTT range and identifying an end time for the time window based on a start time of a next time window, which may be based on a next uplink latency for a next uplink message from the UE and a next mean value of a next back-end RTT range, where the time window and the next time window do not overlap in time.

In some examples of the method, apparatuses, and non-transitory computer-readable medium described herein, determining the time window for transmitting the downlink message to the UE may include operations, features, means, or instructions for determining the time window for a set of multiple uplink messages, where the uplink latency used for determining the time window may be selected based on an operation that pertains to all of the set of multiple uplink messages.

Some examples of the method, apparatuses, and non-transitory computer-readable medium described herein may further include operations, features, means, or instructions for receiving an indication that the RTT latency requirement and the one-way direction delay budget pertain to specific traffic flow types.

In some examples of the method, apparatuses, and non-transitory computer-readable medium described herein, the value of the at least one one-way directional delay budget that may be modified may be one of a downlink application data unit (ADU) delay budget (ADB) value instead of a downlink packet delay budget (PDB) value.

In some examples of the method, apparatuses, and non-transitory computer-readable medium described herein, modifying the value of the at least one one-way directional delay budget may include operations, features, means, or instructions for receiving a downlink message from the base station, the downlink message associated with a downlink latency, where the UE may be the wireless communications entity, determining, based on the downlink latency and the RTT latency requirement, a time window for transmitting, responsive to the downlink message, an uplink message to the base station, and determining an uplink delay budget value that corresponds to the time window, where the uplink delay budget value may be a modified value of the at least one one-way directional delay budget.

In some examples of the method, apparatuses, and non-transitory computer-readable medium described herein, modifying the value of the at least one one-way directional delay budget may include operations, features, means, or instructions for receiving an uplink message from the UE, the uplink message associated with an uplink latency, where the base station may be the wireless communications entity, determining a back-end RTT for round-trip communications between the base station and the application server, and determining a downlink delay budget value for a downlink message responsive to the uplink message, where the downlink delay budget value may be determined based on the uplink latency and the back-end RTT, and where the downlink message may be the message that may be associated with the modified value of the at least one one-way directional delay budget.

Some examples of the method, apparatuses, and non-transitory computer-readable medium described herein may further include operations, features, means, or instructions for receiving a time-stamped downlink packet from the application server, the time-stamped downlink packet associated with the downlink message and determining, a back-end downlink latency based on a time-stamp of the time-stamped downlink packet and a time at which the time-stamped downlink packet may be received at the base station, where determining the back-end RTT for the round-trip communications between the base station and the application server may be based on the back-end downlink latency.

In some examples of the method, apparatuses, and non-transitory computer-readable medium described herein, determining the back-end RTT for the round-trip communications between the base station and the application server may include operations, features, means, or instructions for forwarding a time-stamped uplink packet to the application server, the time-stamped uplink packet associated with the uplink message, receiving a time-stamped downlink packet from the application server, where a time-stamp on the time-stamped downlink packet may be copied from the time-stamped uplink packet, and determining the back-end RTT based on the time stamp and a time at which the time-stamped downlink packet may be received at the base station.

In some examples of the method, apparatuses, and non-transitory computer-readable medium described herein, the wireless communications entity may be the application server and the message that may be associated with the modified value of the at least one one-way directional delay budget may be transmitted from the application server to a network core and includes indications of a downlink delay budget value and an uplink delay budget value.

DETAILED DESCRIPTION

Figure 1:
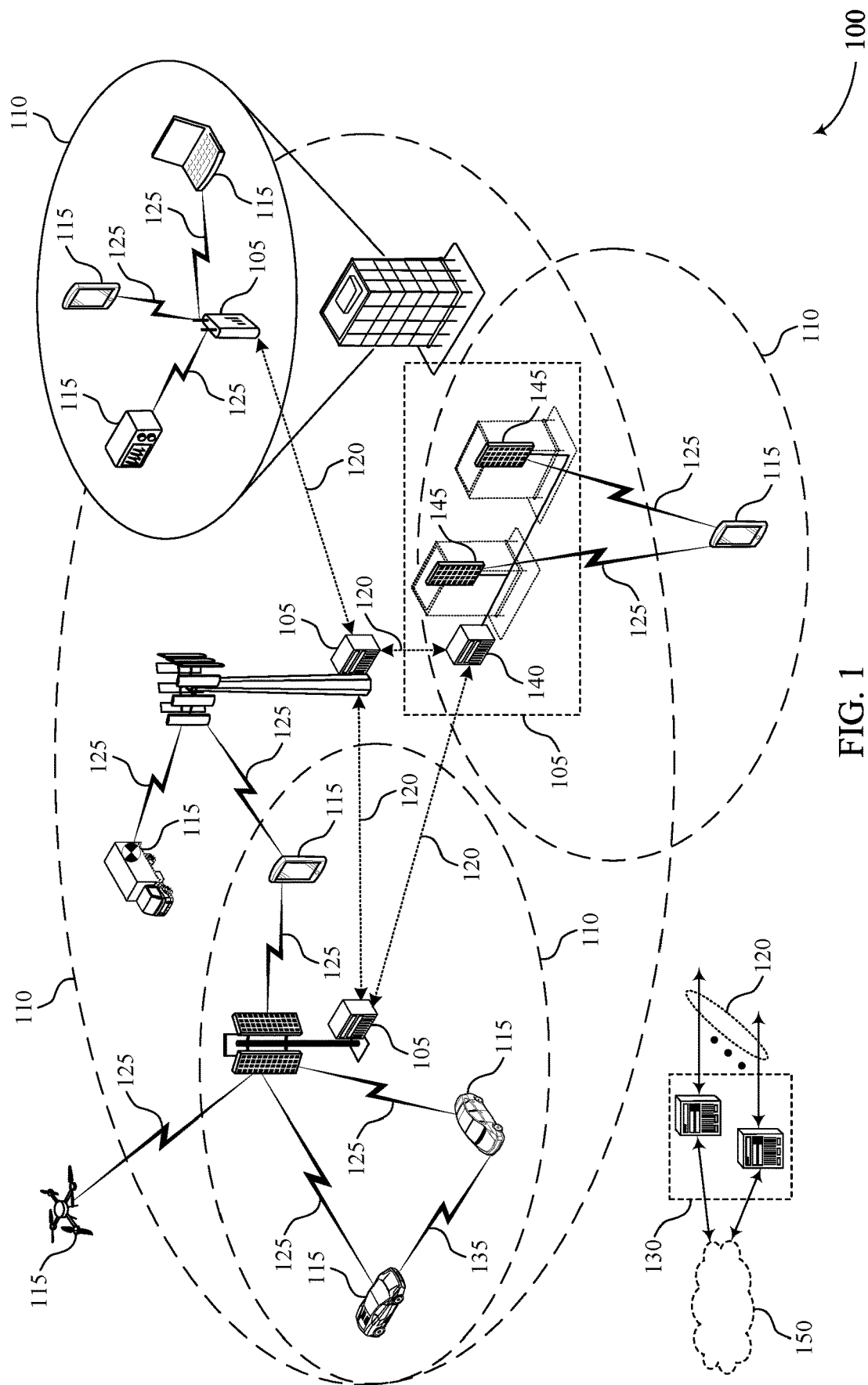
FIGS. 1 and 2 each illustrate an example of a wireless communications system that supports round-trip time (RTT) as a latency performance indicator in accordance with aspects of the present disclosure.

In some wireless communications systems, such as fifth generation (5G) New Radio (NR) systems, a wireless communication network may support techniques for round-trip time (RTT) as a latency performance indicator. For example, the network (e.g., a 5G system (5GS)) may support latency sensitive applications, such as extended reality (XR) applications (e.g., augmented reality (AR), mixed reality (MR), or virtual reality (VR)) or cloud gaming applications. In such applications, a user equipment (UE) may transmit an uplink message (e.g., pose or controller information) to the network and, in response, may receive downlink messages (e.g., encoded video) corresponding to the transmitted uplink message. In some examples, an RTT pertaining to the uplink messages and the corresponding downlink messages may determine the user experience for such applications. As such, an application server (e.g., hosting the application) may specify an RTT latency requirement to the network (e.g., a base station, or a network core) and the network (e.g., or the application server) may determine one or multiple one-way directional delay budgets (e.g., an uplink delay budget, a downlink delay budget, or both) that satisfy the RTT latency requirement. As described herein, the RTT latency requirement may refer to a threshold value associated with an RTT pertaining to communications between a UE and the network.

In some examples, the network may determine a single one-way delay budget for a given traffic flow. That is, network determined delay budgets may be static. However, uplink and downlink traffic conditions may be variable and, as such, the latency of uplink traffic and downlink traffic may also be variable. That is, the latency (e.g., congestion) of uplink traffic and downlink traffic may not be static and, as such, a static delay budget may not accommodate changes in traffic load (e.g., uplink traffic load or downlink traffic load). For example, if the uplink traffic has an increased latency (e.g., the traffic congestion is increased) compared to the downlink traffic, the network may improve the user experience of the application by increasing the delay budget for the uplink traffic (e.g., the uplink delay budget) and decreasing the delay budget for the downlink traffic (e.g., the downlink delay budget), while still meeting the overall RTT requirement. Thus, techniques which provide a static (e.g., rigid) delay budget may be prohibitive and degrade user experience.

Various aspects generally relate to techniques for using RTT as a latency performance indicator, and more specifically, to techniques for improved flexibility in determining uplink and downlink delay budgets. For example, a wireless communications entity, such as a UE, a base station, a network core, or an application server, may determine one-way directional delay budgets based on traffic conditions. In some examples, the wireless communications entity may receive an uplink message and determine (e.g., measure) an uplink latency associated with the received uplink message. The wireless communications entity may determine a downlink delay budget value for downlink messages to be transmitted in response to the received uplink message based on the determined uplink latency. In other words, the wireless communications entity may determine a delay budget value for downlink traffic based on the determined (e.g., current) uplink traffic conditions. For example, the wireless communications entity may determine a downlink delay budget value based on a difference between the RTT latency requirement (e.g., specified by an application server) and the determined uplink latency. Additionally or alternatively, the wireless communications system (e.g., a UE) may determine a delay budget value for uplink traffic based on the determined (e.g., current) downlink traffic conditions.

In some examples, the wireless communications entity may determine a time window for transmitting messages (e.g., downlink messages or uplink messages). For example, the wireless communications entity may determine a time window for transmitting a downlink message based on the reception of the corresponding uplink message. The wireless communications entity may set the time window according to a start value and an end value. The start value of the time window may depend on latency associated with communications between wireless communications entities (e.g., a back-end RTT range). For example, the start value may depend on a network core RTT associated with communications between the network core (e.g., a user plane function (UPF) of the network core) and the base station, a server RTT associated with communications between the application server and the network core, and a server delay associated with the reception of the uplink message and generation of a corresponding downlink message at the application server. The downlink delay budget value for the downlink message may correspond to the time window in which the downlink message is transmitted or another time window for transmitting downlink messages (e.g., if time windows for transmitting downlink messages overlap).

Particular aspects of the subject matter described herein may be implemented to realize one or more of the following potential advantages. For example, the techniques employed by the described wireless communications entities may provide benefits and enhancements to wireless communication entities operating within the network, including enabling a flexible tradeoff between uplink and downlink delay budget values. In some examples, operations performed by the described wireless communications entities may provide improvements to techniques for determining one-way directional delay budget values (e.g., uplink delay budget values, downlink delay budget values, or both) values thereby reducing latency in communications between the network and the UE. The operations performed by the described wireless communications entities to improve the techniques for determining one-way directional delay budget values may include determining a one-way directional delay budget value based on traffic conditions. In some other implementations, operations performed by the described wireless communications entities may also support improvements to power consumption, reliability of wireless communications, user experience, and higher data rates, among other benefits Aspects of the disclosure are initially described in the context of wireless communications systems. Aspects of the disclosure are then described in the context of signaling procedures and process flows. Aspects of the disclosure are further illustrated by and described with reference to apparatus diagrams, system diagrams, and flowcharts that relate to RTT as a latency performance indicator.

FIG. 1 illustrates an example of a wireless communications system 100 that supports RTT as a latency performance indicator in accordance with aspects of the present disclosure. The wireless communications system 100 may include one or more base stations 105, one or more UEs 115, and a network core 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., network core nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a network core 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the network core 130, or with one another, or both. For example, the base stations 105 may interface with the network core 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via network core 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The network core 130 may provide user authentication, access authorization, tracking, Internet Protocol (IP) connectivity, and other access, routing, or mobility functions. The network core 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a UPF). The control plane entity may manage non-access stratum (NAS) functions such as mobility, authentication, and bearer management for the UEs 115 served by the base stations 105 associated with the network core 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a network core 130 supporting radio bearers for user plane data. At the physical layer, transport channels may be mapped to physical channels.

In some examples, the wireless communications system 100 may support techniques for RTT as a latency performance indicator. For example, a wireless communications entity, such as the UE 115, the base station 105, the network core 130, or an application server (not shown), may identify an RTT latency requirement that may pertain to round-trip latency in wireless communications between the UE 115 and the base station 105. The wireless communications entity may identify a one one-way directional delay budget that satisfies the RTT latency requirement for an application (e.g., a latency-sensitive application) of an application server. The application server may be in communication with the UE 115 via the base station 105. The wireless communications entity may modify a value of the one-way directional delay budget and transmit a message that is associated with the modified value of the one one-way directional delay budget.

Figure 2:
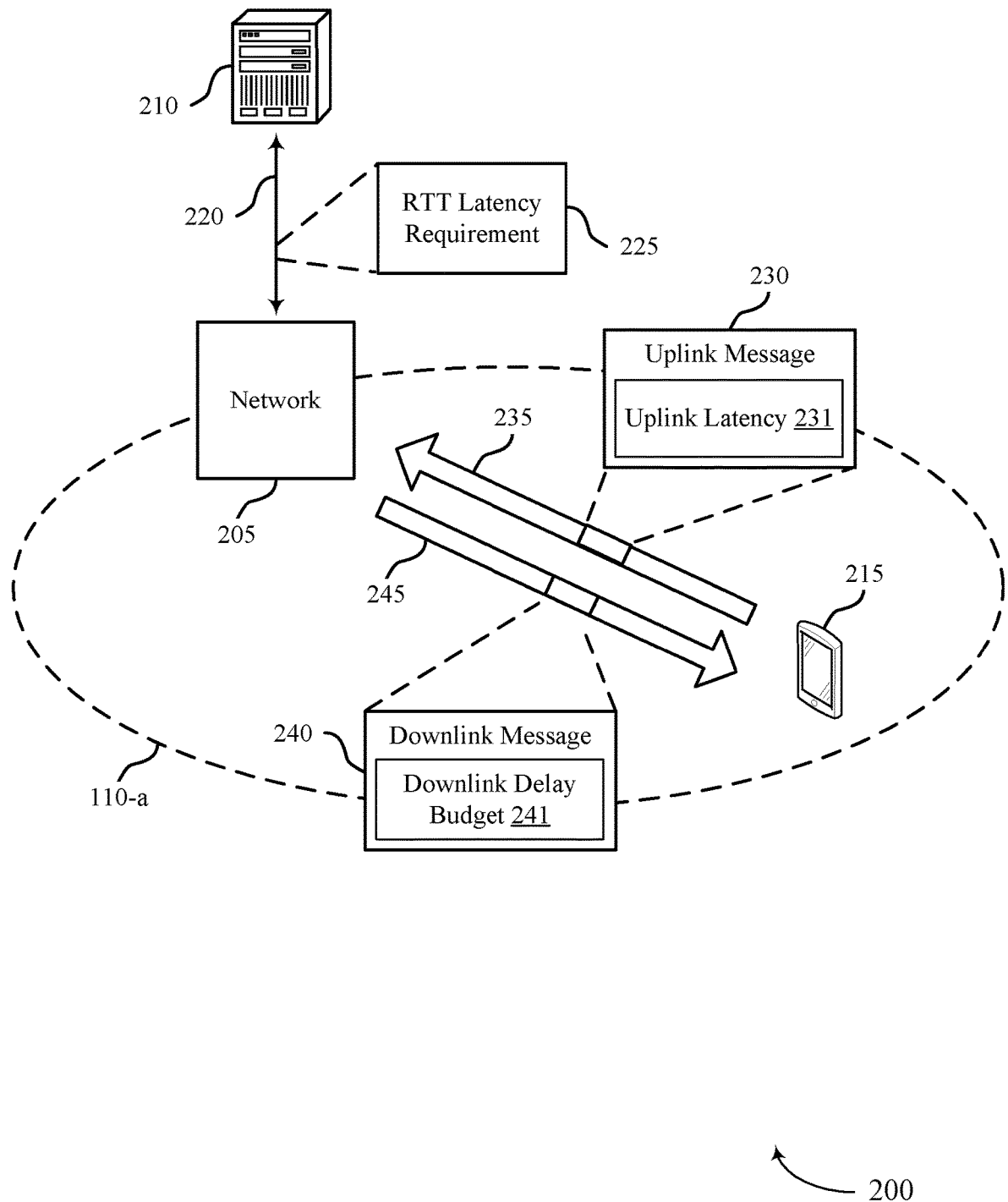

FIG. 2 illustrates an example of a wireless communications system 200 that supports RTT as a latency performance indicator in accordance with aspects of the present disclosure. In some examples, the wireless communications systems 200 may implement aspects of wireless communications system 100. For instance, the wireless communications system 200 may include a UE 215, which may be examples of a UE 115 described with reference to FIG. 1. The wireless communications system 200 may also include a network 205, which may be an example of a base station 105 or a network core 130 described with reference to FIG. 1. The network 205 and the UE 215 may communicate within a geographic coverage area 110-a. The wireless communications system 200 may include features for improved communications between the network 205 and the UE 215, among other benefits.

The wireless communications system 200 may support techniques for reducing the latency of communications between communications device (e.g., one or more UEs) and a wireless communication network, such as a 5GS. The network 205, such as a base station or a network core, may support one or more applications (e.g., XR applications, cloud gaming applications, or both) at the UE 215. The one or more applications may be associated with data traffic (e.g., uplink data traffic, downlink data traffic, or both) that may be latency sensitive. For example, the UE 215 may be a wearable device (e.g., an XR headset with in-device processing capabilities) which may generate and transmit pose or controller information to an application server 210 (e.g., hosting the application) via the network 205. In some examples, the application server 210 may also be referred to as an edge server or an edge cloud. The pose or controller information (e.g., uplink traffic) may be associated with an on-device adjustment corresponding to a pose (e.g., a latest pose of the XR headset). In response, the application server 210 may transmit encoded video (e.g., downlink traffic) to the UE 215 via the network 205, for example to display rendered video on the XR headset. Additionally or alternatively, the UE 215 may represent an example of, or be in communication with, an application client or a client device (e.g., a gaming device or a controller) via an application protocol interface (API). The application client may be software or a logical entity executed by the UE 215.

For some applications (e.g., for XR applications or cloud gaming applications), the UE 215 may transmit uplink traffic (e.g., tracking information or inputs) with relatively small data packets (e.g., 100 bytes) and relatively high frequencies (e.g., every 2 ms or at 500 Hz) compared to other data traffic (e.g., other uplink traffic transmitted by the UE 215). Additionally or alternatively, the network 205 may transmit downlink traffic (e.g., encoded data) with relatively large data packets (e.g., 100 kilobytes) and relatively low frequencies (e.g., every 11 ms, 13 ms, 16 ms, or 22 ms or at 45 frames-per-second (fps), 60 fps, 75 fps, or 90 fps) compared to other data traffic (e.g., other downlink traffic transmitted by the network 205). In some examples, the data traffic (e.g., the uplink traffic and the downlink traffic) for such applications (e.g., the XR applications or the cloud gaming applications) may be transmitted at a relatively high frequency (e.g., periodicity) compared to data traffic associated with other applications. The downlink data traffic for such applications may be periodic or quasi-periodic (e.g., may be based on a frame rate of the data). For example, the UE 215 may receive periodic or quasi-periodic bursts of data traffic, such as encoded video, every frame. In some examples, the data traffic may be transmitted with two (e.g., possible staggered) eye-buffers per frame. For example, each frame may include data associated with a rendering from the perspective of each of two eyes (e.g., for each eye of a two-eye XR headset). The application server 210 may use the uplink traffic to generate the downlink traffic. That is, pose and controller traffic transmitted on the uplink may be used by the application server for downlink traffic generation.

In some examples, user experience (e.g., of the XR applications or the cloud gaming applications) may be determined by an RTT between an uplink data packet (e.g., an uplink pose or controller packet) and a corresponding downlink data packet (e.g., a downlink frame packet). For example, the RTT may correspond to a duration over which the uplink data packet is transmitted from the UE 215 to the network 205 and the downlink data packet is transmitted (e.g., in response to the uplink data packet) from the network 205 to the UE 215. In some examples, the RTT may include a duration between the introduction of an uplink data packet (e.g., an uplink pose or controller packet) to a transmission control protocol/internet protocol (TCP/IP) stack at the transmitting device (e.g., a TCP/IP socket on the uplink side) and the reception of the uplink data packet at a server of the receiving device and a duration between the introduction of a corresponding downlink packet (e.g., downlink frames rendered based on the uplink data packet) to a TCP/IP stack at the receiving device (e.g., a TCP/IP socket on the downlink side) and the reception of the downlink data packet at a server of the transmitting device. That is, the value of the RTT may correspond to a summation of the uplink packet delay and the downlink packet delay.

In some examples, the application server 210 may specify an RTT latency requirement to the network 205 based on the application (e.g., the latency-sensitive application). For example, the user experience of the application may be degraded if the RTT exceeds a threshold (e.g., 20 ms) and, accordingly, the application server may specify an RTT latency requirement to the network 205 such that the threshold may be satisfied. The network 205 may determine delay budgets for uplink traffic and downlink traffic based on the specified RTT latency requirement. For example, the network 205 may specify delay budgets for uplink traffic and downlink traffic via one-way packet delay budgets (PDBs). In some examples, a downlink delay budget value may be specified via a downlink PDB value and an uplink delay budget value may be specified via an uplink PDB value.

The UE 215 and the network 205 may perform wireless communications according to the specified PDBs values. For example, a PDB value may correspond to a threshold for a duration (e.g., a time) in which a packet (e.g., an uplink packed or a downlink packet) may be delayed in the wireless communications system 200. The downlink PDB may be indicated via an information element (IE), such as a DL_PDB IE, and an uplink PDB may be indicated via and IE, such as an UL_PDB IE. In some examples, the one-way delay budgets may be static. For example, the network 205 may determine an uplink PDB (e.g., 8 ms) and a downlink PDB (e.g., 12 ms) such that the RTT latency requirement (e.g., 20 ms) may be satisfied. However, due to changes in uplink and downlink traffic conditions, the latency of uplink traffic and downlink traffic may not be static (e.g., may change dynamically). Accordingly, a static one-way delay budget (e.g., a PDB of 8 ms for uplink traffic and a PDB of 12 ms for downlink traffic) may not accommodate changes in the traffic load.

For example, if the uplink traffic has a higher latency (e.g., is congested) compared to the downlink traffic, user experience may be improved by increasing and the uplink delay budget value (e.g., the uplink PDB value) and decreasing the downlink delay budget value (e.g., the downlink PDB value). Thus, a static breakdown of the RTT latency requirement into (e.g., into a single uplink PDB value and a single downlink PDB value) may reduce the flexibility of the network to satisfy the RTT latency requirement, for example if the uplink congestion, the downlink congestion, or both, change (e.g., vary differently). Additionally or alternatively, measurement of one-way delay (e.g., a latency in uplink traffic or a latency in downlink traffic) may be complex and include a time-synchronization between the sender (e.g., the UE 215) and the receiver (e.g., the network 205) and, accordingly, may increase processing at the UE 215, the network 205, or both.

In some examples, the network 205 (e.g., the base station or network core) may use RTT as a latency performance indicator for enhancing resources to satisfy the RTT latency requirement specified by the application server. For example, a wireless communications entity (e.g., the UE 215, the network 205, or the application server 210) may identify an RTT latency requirement that may pertain to round-trip latency in wireless communications between the UE 215 and the network 205 (e.g., a base station). In some examples, the wireless communications entity may include a base station or a network core of the network 205. For example, the network 205, such as the base station or the network core, may receive an RTT latency requirement 225 from the application server 210 via a communicating link 220 (e.g., a backhaul link). The network 205 may identify a one one-way directional delay budget (e.g., a downlink delay budget or an uplink delay budget) that satisfies the RTT latency requirement 225 for an application (e.g., a latency-sensitive application) of an application server (e.g., hosted by the application server 210). The application server 210 may be in communication with the UE 215 via the network 205 (e.g., via the base station). The network 205 may receive an uplink message 230 from the UE 215 via the communication link 235 (e.g., an uplink). The uplink message 230 may be associated with an uplink latency 231.

Additionally or alternatively, the network 205 may determine a time window (not shown) for transmitting downlink message based on the uplink latency 231 and the RTT latency requirement 225 and a downlink delay budget value (e.g., a downlink PDB 241) that corresponds to the time window. In some examples, the downlink PDB 241 may be a modified value of the one-way directional delay budget. The network 205 may transmit a downlink message 240 to the UE 215 over the time window and according to the downlink PDB 241. The network 205 may transmit the downlink message 240 to the UE 215 via the communication link 245 (e.g., a downlink). In some examples, the techniques employed by the described wireless communications entities (e.g., the application server 210, the network 205, and the UE 215) may provide benefits and enhancements to wireless communication entities operating within the network, including enabling a flexible tradeoff between uplink and downlink delay budget values.

Figure 3A:
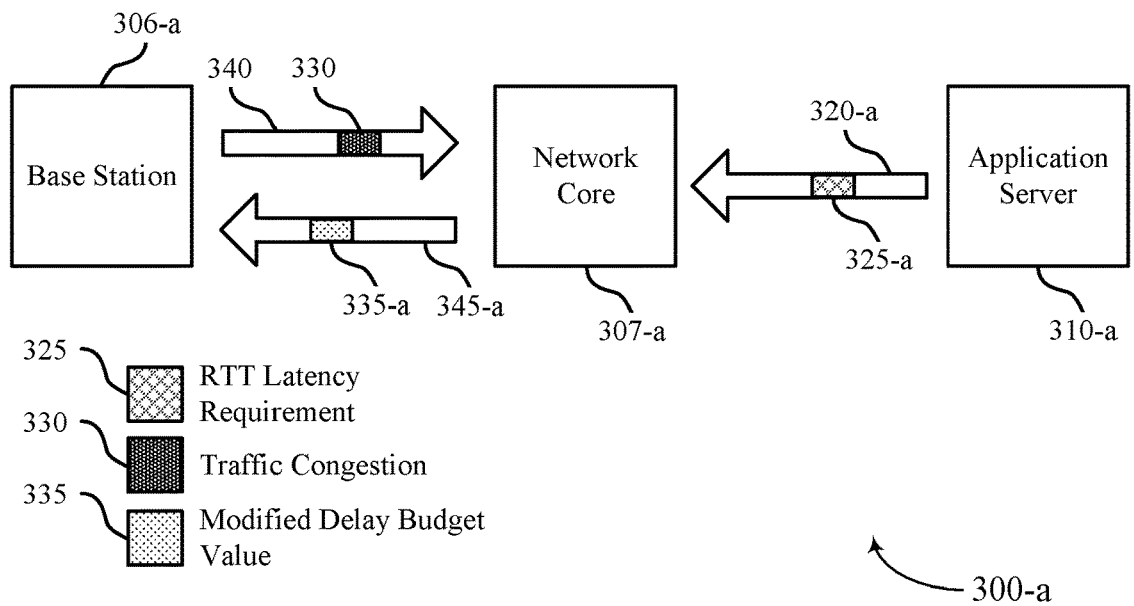
FIGS. 3A, 3B, and 3C each illustrate an example of a signaling procedure that supports RTT as a latency performance indicator in accordance with aspects of the present disclosure.
Figure 3B:
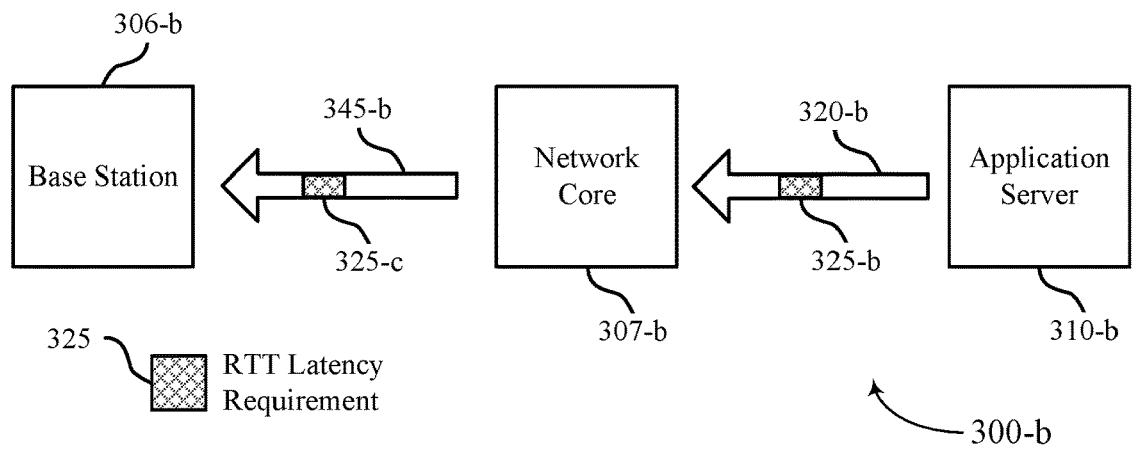
Figure 3C:
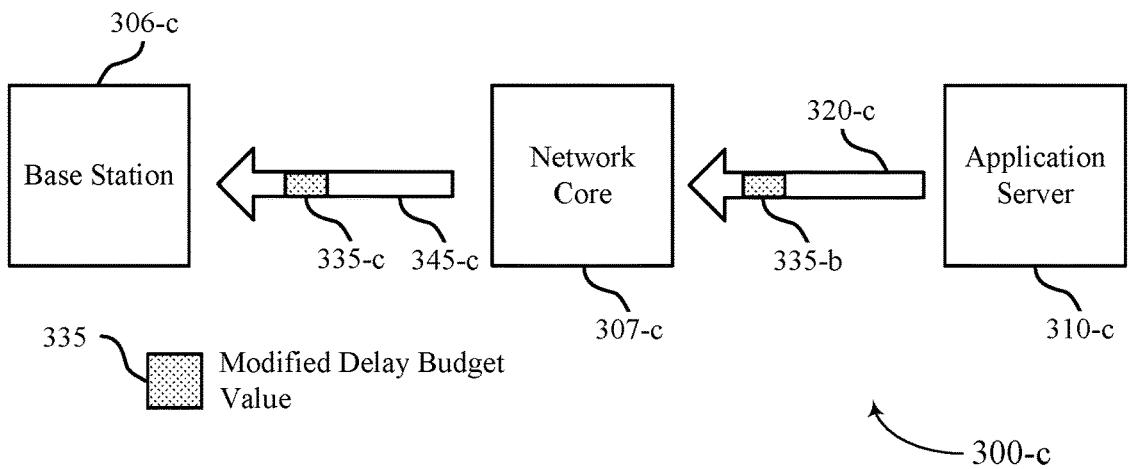

FIGS. 3A, 3B, and 3C illustrate examples of signaling procedures 300 (e.g., a signaling procedure 300-a, a signaling procedure 300-b, and a signaling procedure 300-c) that support RTT as a latency performance indicator in accordance with aspects of the present disclosure. In some examples, the signaling procedures 300 may implement aspects of wireless communications system 100 and wireless communications system 200. For instance, the signaling procedures 300 may include a base station (e.g., a base station 306-a, a base station 306-b, or a base station 306-c), a network core (e.g., a network core 307-a, a network core 307-b, or a network core 307-c), and an application server (e.g., an application server 310-a, and application server 310-b, or an application server 310-c), which may be examples of the corresponding devices described with reference to FIGS. 1 and 2.

In some examples, to reduce the latency of communications in a wireless communications system, a wireless communications entity (e.g., the application servers 310, the base stations 306, or the network cores 307) may determine a delay budget for uplink traffic and downlink traffic based on traffic conditions. For example, the application servers 310 may specify an RTT latency requirement towards a network (e.g., a 5GS), such as the network cores 307 or the base stations 306. Optionally, the application servers 310 may specify (e.g., recommend) one-way directional delay budget values (e.g., a downlink PDB value or an uplink PDB value) to the network cores 307 or the base stations 306. In response, the network cores 307 or the base stations 306 may split the RTT latency requirement into the one-way delay budgets (e.g., into the downlink PDB and the uplink PDB).

In some examples, the network cores 307 or the base stations 306 may use the recommended one-way delay budget values indicated by the application servers 310 and measure the latency for each data packet (e.g., each downlink or uplink data packet) to determine whether the recommended (e.g., initial) one-way delay budget values are satisfied. That is, the network cores 307 or the base stations 306 may track of the uplink delay budget (e.g., the uplink PDB) for each uplink packet and the downlink delay budget (e.g., the downlink PDB) for each downlink packet. In some examples, the network cores 307 or the base stations 306 may report statistics (e.g., information) associated with the uplink delay budget and the downlink delay budget to the application server. For example, the network cores 307 or the base stations 306 may report information regarding a number (e.g., or percentage) of uplink packets satisfying the uplink delay budget (e.g., uplink PDB) or a number (e.g., or percentage) of downlink packets satisfying the downlink delay budget (e.g., downlink PDB). Additionally or alternatively, the network cores 307 or the base stations 306 may report information regarding a difference between the measured uplink delay (e.g., uplink latency) and the uplink delay budget and a difference between the measured downlink delay (e.g., downlink latency) and the downlink delay budget.

In some examples, the application servers 310, the base stations 306, or the network cores 307 (e.g., a wireless communications entity) may modify the initial downlink delay budget value or the uplink delay budget value. For example, if the initial one-way directional delay budgets are not satisfied or if the uplink traffic or downlink traffic is congested, the wireless communications entity may modify the initial downlink delay budget value or the uplink delay budget value. That is, the wireless communications entity may modify the downlink delay budget (e.g., the downlink PDB) or the uplink delay budget (e.g., the uplink PDB) based on the uplink and downlink congestion, such that RTT latency requirement may equal a summation of the downlink PDB and the uplink PDB. In some examples, the wireless communications entity may modify the downlink delay budget value and the uplink delay budget value according to a relatively slow time scale (e.g., tens or hundreds of ms), for example compared to other parameters associated with communications between a UE and the network.

For example, the wireless communications entity may increase the uplink delay budget value and decrease the downlink delay budget value if the uplink traffic has an increased latency (e.g., is congested) compared to the downlink traffic. Additionally or alternatively, the wireless communications entity may decrease the uplink delay budget value and increase the downlink delay budget value if the downlink traffic has an increased latency (e.g., is congested) compared to the uplink traffic. That is, the wireless communications entity may update the uplink delay budget (e.g., the uplink PDB) or the downlink delay budget (e.g., the downlink PDB) based on congestion (e.g., of the uplink traffic and the downlink traffic).

As illustrated in the example of FIG. 3A, the application server 310-a may transmit an indication of an RTT latency requirement 325-a to the network core 307-a via a communication link 320-a (e.g., via a network exposure function (NEF)). In some examples, the network core 307-a may transmit an indication of a modified value of a one-way directional delay budget (e.g., one or more modified delay budget values 335) to the base station 306-a via a communication link 345-a (e.g., a wired or wireless backhaul link). The network core 307-a may transmit a modified delay budget value 335-a based on traffic congestion information. For example, the base station 306-a may transmit an indication of traffic congestion 330 to the network core 307-a (via the communication link 340 (e.g., a wired or wireless backhaul link) and the network core 307-a may determine the modified delay budget value 335-a based on the traffic congestion 330. That is, the network core 307-a may receive the RTT latency requirement and update the downlink delay budget (e.g., the downlink PDB) and the uplink delay budget (e.g., the uplink PDB) based on uplink and downlink congestion. In some examples, the base station 306-a may indicate the traffic congestion 330 to the network core 307-a via a quality of service message (e.g., notification). That is, the network core 307-a may infer the uplink and downlink congestion based on a quality of service message transmitted from the base station 306-a to the network core 307-a.

As illustrated in the example of FIG. 3B, the application server 310-b may transmit an indication of an RTT latency requirement (e.g., one or more RTT latency requirements 325) to the base station 306-b via the network core 307-b. For example, the application server 310-b may transmit an indication of an RTT latency requirement 325-b to the network core 307-b via a communication link 320-b and the network core 307-b may transmit an indication of an RTT latency requirement 325-c to the base station 306-b via the communication link 345-b. The RTT latency requirement 325-c may be a same RTT as (e.g., or different from) the RTT latency requirement 325-b. That is, the application server 310-b may specify an RTT latency requirement to the network core 307-b and the network core 307-b may forward the specified RTT latency requirement to the base station 306-b. The base station 306-b may split the RTT latency requirement 325-c into the downlink delay budget value and the uplink delay budget value. That is, the base station 306-b may modify the downlink delay budget value (e.g., the downlink PDB value) or the uplink delay budget value (e.g., the uplink PDB value) such that a summation of the downlink delay budget value and the uplink delay budget value equal the RTT latency requirement 325-c specified by the application server 310-b (e.g., via the network core 307-b). In some examples, the base station 306-b may modify the downlink delay budget value and the uplink delay budget value based on traffic conditions (e.g., uplink and downlink latency or congestion).

As illustrated in the example of FIG. 3C, the application server 310-c may transmit an indication of a modified value of a one-way directional delay budget (e.g., one or more modified delay budget values 335) to the base station 306-c via the network core 307-c. For example, the application server 310-c may alter (e.g., modify) a one-way delay budget (e.g., PDB) based on the RTT latency requirement and transmit the modified one-way directional delay budget (e.g., one or more modified delay budget values 335) to the base station 306-c via the network core 307-c. In some examples, the application server may transmit a modified delay budget 335-b to the network core 307-c via the communication link 320-c and the network core 307-c may transmit a modified delay budget value 335-c to the base station 306-c via the communication link 345-c. That is, the network core 307-c may forward a modified delay budget value from the application server 310-c to the base station 306-c.

In some examples, the application server 310 may split the RTT latency requirement (e.g., one or more RTT latency requirements 325) into the downlink delay budget value (e.g., the downlink PDB value) and the uplink delay budget value (e.g., the uplink PDB value) such that a summation of the downlink delay budget value and the uplink delay budget value equal the RTT latency requirement. For example, the application server 310-c may modify the downlink delay budget value and the uplink delay budget value according to a relatively slow time scale (e.g., tens or hundreds of ms), for example compared to other parameters associated with communications between a UE and the network. The application server 310-c may modify the downlink delay budget value the uplink delay budget value based on the uplink delay or the downlink delay (e.g., the measured uplink delay or the measured downlink delay) such that a summation of the downlink delay budget value and the uplink delay budget value equal the RTT latency requirement.

In some examples, the application servers 310 may determine (e.g., track) the uplink delay budget (e.g., the uplink PDB) for each uplink packet and the downlink delay budget (e.g., the downlink PDB) for each downlink packet. For example, the application servers 310 may track information regarding a number (e.g., or percentage) of uplink packets satisfying the uplink delay budget (e.g., uplink PDB) or a number (e.g., or percentage) of downlink packets satisfying the downlink delay budget (e.g., downlink PDB). Additionally or alternatively the application servers 310 may track information regarding a difference between the measured uplink delay (e.g., uplink latency) and the uplink delay budget and a difference between the measured downlink delay (e.g., downlink latency) and the downlink delay budget. In some examples, the application servers 310 may increase the uplink delay budget value and decrease the downlink delay budget value if the number (e.g., or percentage) of uplink data packets that fail to satisfy the initial uplink delay budget value is increased relative to the number (e.g., or percentage) of downlink data packets that fail to satisfy the initial downlink delay budget value.

Additionally or alternatively, the application servers 310 may decrease the uplink delay budget value and increase the downlink delay budget value if the number (e.g., or percentage) of uplink data packets that fail to satisfy the initial uplink delay budget value is decreased relative to the number (e.g., or percentage) of downlink data packets that fail to satisfy the initial downlink delay budget value. That is, the application servers 310 may increase the uplink delay budget (e.g., uplink PDB) and decrease the downlink delay budget (e.g., downlink PDB) if the uplink data packets fail to satisfy (e.g., are missing) the uplink PDB and may increase the downlink PDB and decrease the uplink PDB if the downlink data packets fail to satisfy (e.g., are missing) the downlink PDB.

Figure 4:
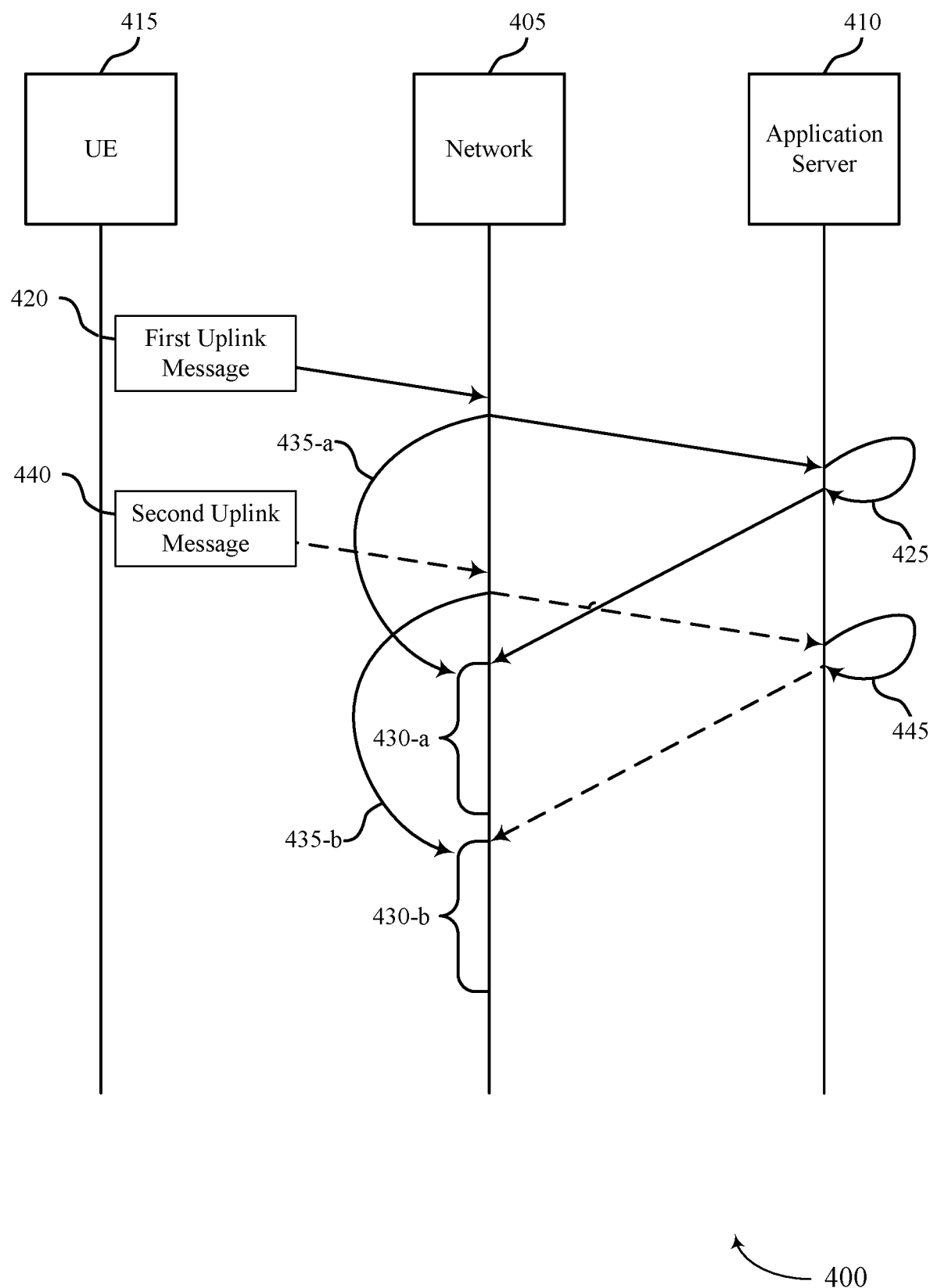
FIGS. 4 through 7 each illustrate an example of a process flow that supports RTT as a latency performance indicator in accordance with aspects of the present disclosure.

FIG. 4 illustrates an example of a process flow 400 that supports RTT as a latency performance indicator in accordance with aspects of the present disclosure. In some examples, the process flow 400 may implement one or more aspects of wireless communications systems 100 and the wireless communications system 200. For example, the process flow 400 may include example operations associated with a UE 415, which may be examples of the corresponding devices described with reference to FIGS. 1, 2, 3A, 3B, and 3C. The process flow 400 may also include example operations associated with a network 405, which may be an example a base station or a network core described with reference to FIGS. 1, 2, 3A, 3B, and 3C. The process flow 400 may further include example operations associated with an application server 410, which may be an example of an application server described with reference to FIGS. 1, 2, 3A, 3B, and 3C. The operations performed by the UE 415, the network 405, and the application server 410 may support improvements to communications between the UE 415 and the network 405, among other benefits.

In some examples, a wireless communications entity (e.g., the network 405, the application server 410, or the UE 415) may determine one-way direction delay budgets (e.g., an uplink delay budget, a downlink delay budget, or both) based on an RTT latency requirement specified by the application server 410. For example, the application server 410 may specify the RTT latency requirement to the network 405 (e.g., towards the 5GS) and the network 405 may determine an uplink delay budget, a downlink delay budget, or both, based on the specified RTT latency requirement and traffic information. The traffic information may include uplink traffic information, downlink traffic information, or both. The traffic information may be an example of traffic congestion information as described with respect to FIG. 3. For example, the network 405 may determine (e.g., measure) an uplink latency (e.g., as indicated via a 5G_UL_latency IE) associated with uplink messages (e.g., uplink data packets) from the UE 415.

Additionally or alternatively, the network 405 may determine a time window for transmitting (e.g., forwarding) one or more downlink messages from the application server 410 to the UE 415. The downlink messages may correspond to (e.g., may be transmitted in response to) an uplink message received at the application server 410 from the UE 415. In other words, upon receiving an uplink message, the network 405 may maintain a time window (e.g., a time window 430-a or a time window 430-b) and serve the corresponding downlink messages (e.g., downlink data packets) arriving over the time window (e.g., from the application server 410) according to a downlink delay budget. The downlink delay budget may correspond to a difference between the RTT latency requirement and the measured uplink latency. The measured uplink latency (e.g., or a measured downlink latency) may be an example of a measured uplink delay (e.g., or a measured downlink delay) described with reference to FIG. 3.

For example, at 420, the UE 415 may transmit a first uplink message to the application server 410 via the network 405. The network 405 may determine a first uplink latency associated with the first uplink message. At 425, and in response to receiving the first uplink message, the application server 410 may generate and transmit one or more downlink messages to the UE 415 via the network 405. In some examples, the network 405 may receive the downlink messages (e.g., to be transmitted to the UE 415) from the application server 410 over a time window 430-a. The network 405 may determine (e.g., set) the time window 430-*a* according to a start time, such as indicated via an Win_DL_start IE, and an end time, such as indicated via an Win_DL_end IE. In some examples, the start time and the end time may be based on a time (e.g., a time instance) in which an uplink message (e.g., the first uplink message 420) is received at the network 405. That is, the start time and the end time may be based on an arrival time of the uplink message (e.g., an uplink data packet), such as indicated by an UL_packet_time IE. In some examples, the network 405 may transmit the downlink messages received over the time window 430-*a* to the UE 415 according to a first downlink delay budget value. The first downlink delay budget value may be determined by the network 405 based on the first uplink latency (e.g., associated with the first uplink message). For example, the first downlink delay budget value may be equal to a difference between an RTT latency requirement (e.g., specified by the application server 410) and the first uplink latency.

In some examples, the time window for transmitting downlink messages (e.g., one or more time windows 430) may correspond to a time window in which downlink message (e.g., transmitted in response to an uplink message) may be, or may have an increased likelihood of being, received at the network 405 from the application server 410. In other words, the time windows 430 may occur where downlink message (e.g., downlink data packets) resulting from an uplink message (e.g., uplink data packet) may be located or may have an increased likelihood of being located. In some examples, the start time and the end time may be based on a distance parameter (X) associated with latency in communications between one or more entities of a wireless communications system (e.g., the network 405 and the application server 410). In some examples, the distance parameter may represent a distance (e.g., in time, a temporal distance) from the reception of an uplink message to a time in which the time window for transmitting downlink message may occur (e.g., the start time). That is, the distance parameter may represent the distance (e.g., a variable distance) at which a time window for transmitting downlink messages (e.g., a downlink time window) may be set. For example, the distance parameter may represent a distance (e.g., a distance 435-*a* or a distance 435-*b*) from the reception of an uplink message (e.g., at the network 405) to a downlink time window (e.g., the time window 430-*a* or the time window 430-*b*). As illustrated in the example of FIG. 4, the distance parameter may represent the distance 435-*a* between the reception of the first uplink message at the network 405 and the time window 430-*a*.

In some examples, the distance parameter may be referred to as a back-end round trip time. For example, the distance parameter may be based on one or more latencies associated with communications between the network 405 (e.g., a network core, a base station, or both) and the application server 410, such as a network core RTT, a server RTT, and a server delay. The network core RTT may correspond to an RTT component associated with communications between the network core (e.g., a user plane function) and the base station. The server RTT may correspond to an RTT component associated with communications between the application server 410 and the network core. The server delay may correspond to a time window over which the application server 410 receives an uplink message (e.g., the first uplink message or the second uplink message) and generates the corresponding downlink message. In some examples, the network core RTT may be determined by (e.g., known to) the network 405. Additionally or alternatively, the server RTT and the server delay may be signaled from the application server 410 to the network 405 (e.g., the 5GS). In some examples, the distance parameter (X) may correspond to a summation of the network core RTT, the server RTT, and the server delay. The latency associated with each of the core RTT, the server RTT, and the server delay may change (e.g., may vary based on a traffic conditions, such as traffic load) and, as such, the distance parameters may also change. Accordingly, the network 405 may determine a range of values for the distance parameter (e.g., a back-end RTT range). For example, the distance parameter value associated with the distance 435-*a* may be different from (e.g., or the same as) the distance parameter value associated with the distance 435-*b*.

In some examples, the network 405 may determine the start time and the end time for uplink messages (e.g., independently for each uplink message) received at the network 405 (e.g., or the application server 410). In some examples, the start time may be based on a lowest distance parameter value (e.g., a minimum value of the distance parameter) or an otherwise acceptable distance parameter value of the range of values determined for the distance parameter. Additionally or alternatively, the end time may be based on the reception of an uplink message (e.g., a time at which an uplink message is received at the network 405) and a highest distance parameter value (e.g., a maximum value of the distance parameter) or an otherwise acceptable distance parameter value of the range of values for the distance parameter.

The network 405 (e.g., a base station) may maintain (e.g., store) multiple time windows 430 that may each correspond to different uplink messages (e.g., uplink packets). For example, at 440, the UE 415 may transmit a second uplink message to the application server 410 via the network 405. At 445, and in response to receiving the second downlink message, the application server 410 may generate and transmit downlink messages to the UE 415 via the network 405. Accordingly, upon receiving the second uplink message, the network 405 may determine a second time window (e.g., the time window 430-*b*) and serve the downlink messages corresponding to the second uplink message and arriving over the time window 430-*b* according to a second uplink delay budget.

In some examples, two or more time windows 430 (e.g., the time window 430-*a* and the time window 430-*b*) may overlap (e.g., in time). As such, the network 405 may receive downlink messages (e.g., from the application server 410) that correspond to the first uplink message, the second downlink message, or both, over a portion of the time windows 430 that overlap. In some examples, the network 405 may determine (e.g., calculate) a downlink delay budget value for each overlapping time window 430 and transmit the downlink messages (e.g., received over the portion of the time windows 430 which overlap) according to a lowest downlink delay budget value (e.g., a minimum downlink delay budget value) or an otherwise acceptable downlink delay budget value of the determined downlink delay budget values. That is, for downlink messages arriving at the network 405 when multiple time windows 430 overlap, the network may apply the lowest downlink delay budget value (e.g., a minimum downlink delay budget value) or an otherwise acceptable downlink delay budget value of the determined downlink delay budget values for each time window 430.

In other examples, the time windows 430 may not overlap. For example, the start time may be based on the reception of an uplink message (e.g., a time at which an uplink message is received at the network 405) and an average distance parameter value (e.g., a mean value of the distance parameter) or an otherwise acceptable distance parameter value of the range of values for the distance parameter. Additionally or alternatively, the start time may be based on a lowest distance parameter value (e.g., a minimum value of the distance parameter) or an otherwise acceptable distance parameter value of the range of values for the distance parameter.

Additionally or alternatively, the end time may be based on the start of another (e.g., a next) time window 430. For example, the time window 430-*a* may end at the start of time window 430-*b*. In such examples, the network 405 may receive downlink messages corresponding to the first uplink message in the time window 430-*a* and downlink message corresponding to the second uplink message in the time window 430-*b*. That is, downlink messages corresponding to different uplink messages may arrive at the network 405 over non-overlapping (e.g., individual) time windows. As such, the network 405 may determine (e.g., calculate) a downlink delay budget for each time window 430 and transmit the downlink messages received in each time window 430 according to the downlink delay budget determined for the respective time window 430. For example, the network 405 may transmit downlink messages received during the time window 430-*a* according to the first downlink delay budget (e.g., based on the first uplink latency of the first uplink message) and transmit downlink messages received during the time window 430-*b* according to a second downlink delay budget (e.g., based on a second uplink latency of the second uplink message).

In some examples, the network 405 may reduce computations (e.g., processing) by maintaining time windows 430 for a set of uplink messages (e.g., rather than for each uplink message). In such examples, the network 405 may measure an uplink latency for each uplink message of the set of uplink messages and determine a lowest uplink latency (e.g., a minimum value of the uplink latency), an average uplink latency (e.g., a mean value of the uplink latency), a highest uplink latency (e.g., a maximum value of the uplink latency), or an otherwise acceptable uplink latency of the determined uplink latencies for the set of uplink messages. The network 405 may use the lowest latency, the average latency, the highest latency (e.g., a maximum latency), or the otherwise acceptable latency of the set of uplink latencies corresponding to the set of uplink messages to determine (e.g., compute) a downlink delay budget to be applied to downlink messages received during each time window associated with the set of uplink messages.

Additionally or alternatively, the network 405 may use an RTT latency requirement (e.g., specified by the application server 410) for particular traffic flows. For example, the application server may specify a particular uplink traffic flow and a downlink traffic flow for which a particular RTT latency requirement applies. In such an example, the network 405 may use uplink messages of the specified uplink flow to maintain time windows 430. As such, the downlink messages (e.g., corresponding to the uplink messages of the specified uplink flow) received the time windows 430 may be of the specified downlink flow. Additionally or alternatively, the wireless communications entity may determine delay budget values (e.g., uplink delay budget values and downlink delay budget values) for application data units (ADUs).

For example, an uplink delay budget value and a downlink delay budget value may be specified via ADU delay budgets (ADBs), such as indicated via a DL_ADB IE, for example rather than via PDBs. That is, a wireless communications device (e.g., the network 405, the application server 410, or the UE 415) may determine (e.g., calculate) an ADB for ADUs (e.g., rather than calculating a PDB for data packets). Accordingly, the network 405 may transmit ADUs received over the time windows 430 according to a determined ADB. That is, a time window may apply to ADUs (e.g., for transmitting ADUs), and a downlink ADB may be determined (e.g., calculated) for each time window. In some examples, the network 405 may use a quality of service parameter to determine (e.g., infer) the uplink delay budget, the downlink delay budget, or both. For example, the quality of service parameter may be an ADB or a PDB.

In some examples, the network 405 may determine a one-way directional delay budget (e.g., an uplink delay budget, a downlink delay budget, or both) based on a back-end RTT time for round-trip communications between the base station and the application server (e.g., an application to server RTT). For example, rather than determining a one-way direction delay budget based on a latency requirement of the RTT associated with communications between the UE 515 and the network 405 (e.g., rather than controlling the RTT associated with communications between the UE 415 and the network 405), the network 405 may determine the one-way directional delay budget based on a latency requirement of an RTT associated with communications between the UE 415, the network 405, and the application server 410 (e.g., the network 405 may control the application to server RTT). In some examples, one or more protocols between the application server 410 and the network 405 (e.g., the network core, such as a user plane function) may be used to determine (e.g., measure) a delay experienced by messages (e.g., data packets) transmitted between the application server 410 and the network 405. For example, the network 405 may time-synchronize the application server 410 with the network 405.

In some examples, the network 405 (e.g., and the application server 410) may use time-stamping on messages transmitted between the application server 410 and the network 405 to measure the delays experienced by such messages. For example, the application server 410 may use (e.g., re-use) time-stamps (e.g., via a real-time transport protocol) from uplink messages (e.g., uplink packets) for the downlink message or may encapsulate the downlink messages (e.g., downlink packets) in a packet tunnel with time-stamps. That is, the application server 410 may encapsulate the downlink packets to be tunneled from the application server 410 to the network 405 for transmission to the UE 415.

In some examples, the network 405 may determine a back-end downlink latency (e.g., a latency associated with downlink packets transmitted from the application server 410 to the network 405) based on a time-stamp of a time-stamped downlink packet (e.g., transmitted to the network 405 from the application server 410) and the arrival of the time-stamped downlink packet at the network 405. In some examples, the time-stamp of the time-stamped downlink packet may be copied from an uplink packet (e.g., corresponding to an uplink message) transmitted from the network 405 to the application server 410. In such an example, the network 405 may determine a back-end RTT for round-trip communications between the application server 410 and the network 405. That is, the latency associated with communications between the network 405 and the application server 410 (e.g., the back-end RTT) may correspond to a difference between the time-stamp of the downlink packet and a time at which the time-stamped downlink packet is received at the network 405. In some examples, a back-end uplink latency associated with time-stamped uplink packets (e.g., corresponding to uplink messages received at the network 405) transmitted from the network 405 to the application server 410 may be determined based on a time-stamp of the time-stamped uplink packet and an arrival time of the time-stamped uplink packet at the application server 410.

In some examples, the network 405 may determine a delay budget (e.g., a remaining delay budget) for the downlink packets based on the back-end RTT and an uplink latency associated with the corresponding uplink packet. That is, the network 405 may use the time-stamp (e.g., of the time-stamped downlink packet) to adjust the downlink delay budget. Additionally or alternatively, a scheduler associated with the network 405 (e.g., a base station scheduler) may use the time-stamps to control (e.g., influence) scheduling decisions for the downlink packet (e.g., decisions associated with resources used to transmit the downlink packet to the UE 415).

Figure 5:
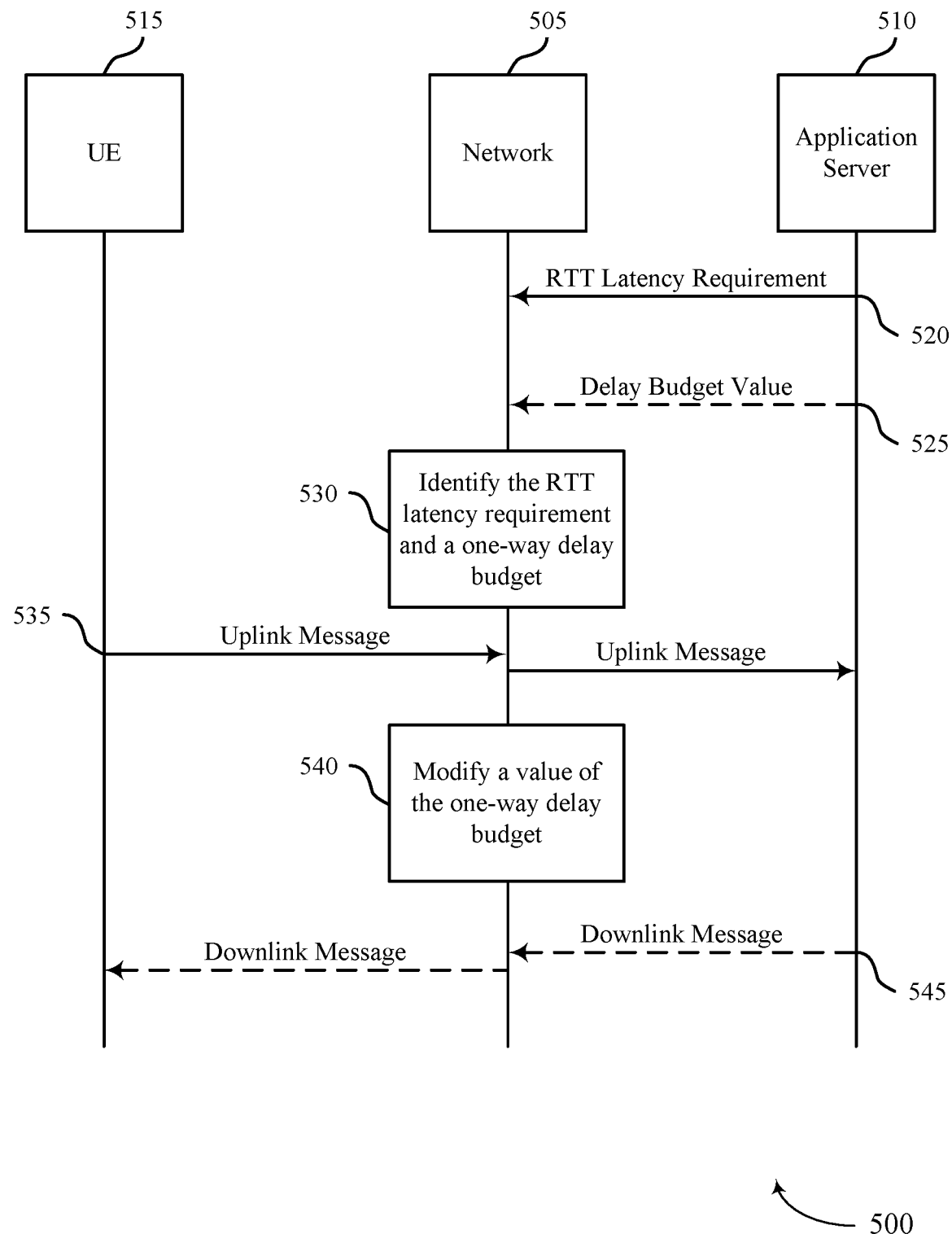

FIG. 5 illustrates an example of a process flow 500 that supports RTT as a latency performance indicator in accordance with aspects of the present disclosure. In some examples, the process flow 500 may implement one or more aspects of wireless communications systems 100 and the wireless communications system 200. For example, the process flow 500 may include example operations associated with a UE 515, which may be examples of the corresponding devices described with reference to FIGS. 1, 2, 3A, 3B, and 3C. The process flow 500 may also include example operations associated with a network 505, which may be an example a base station or a network core described with reference to FIGS. 1, 2, 3A, 3B, and 3C. The process flow 500 may further include example operations associated with an application server 510, which may be an example of an application server described with reference to FIGS. 1, 2, 3A, 3B, and 3C. The operations performed by the UE 515, the network 505, and the application server 510 may support improvements to communications between the UE 515 and the network 505, among other benefits.

In some examples, a wireless communications entity, such as the UE 515, the network 505 (e.g., a network core or a base station), or the application server 510 may determine one-way directional delay budgets based on traffic conditions. For example, at 520, the application server 510 may transmit an indication of an RTT latency requirement to the network 505. In some examples, at 525, the application server may transmit a delay budget value (e.g., an uplink delay budget value or a downlink delay budget value) to the network 505. The application server 510 may determine the delay budget value based on delay budget statistics determined at the application server 510 or at the network 505 and indicated to the application server 510.

At 530, the network 505 may identify the RTT latency requirement and a one-way (e.g., directional) delay budget. The RTT latency requirement may pertain to round-trip latency in wireless communications between the UE 515 and the network 505 (e.g., the base station). In some examples, the network 505 may identify the one-way delay budget based on the delay budget value transmitted from the application server 510. Additionally or alternatively, the network 505 may determine the one-way delay budget based on traffic congestion information (e.g., determine at the network 505). The one one-way delay budget may satisfy the RTT latency requirement for an application of the application server 510 (e.g., an application server that is in communication with UE 515 via the network 505).

At 535, the UE 515 may transmit an uplink message to the application server 510 via the network 505. That is, the network 505 may monitor communications between the UE 515 and the application server 510. At 540, the network 505 may modify a value of the one-way delay budget for the wireless communications between the UE 515 and the network 505. In some examples, the application server 510 or the network 505 may transmit a message associated with the modified value of the one-way delay budget. For example, at 545, the application server 510 may transmit a downlink message to the UE 515 via the network 505. That is, the application server 510 may transmit a downlink message (e.g., in response to the uplink message) to the network 505 and the network 505 may forward the downlink message to the UE 515. The network 505 may forward (e.g., transmit) the downlink message to the UE 515 according to the modified value of the one-way (e.g., downlink) delay budget.

Figure 6:
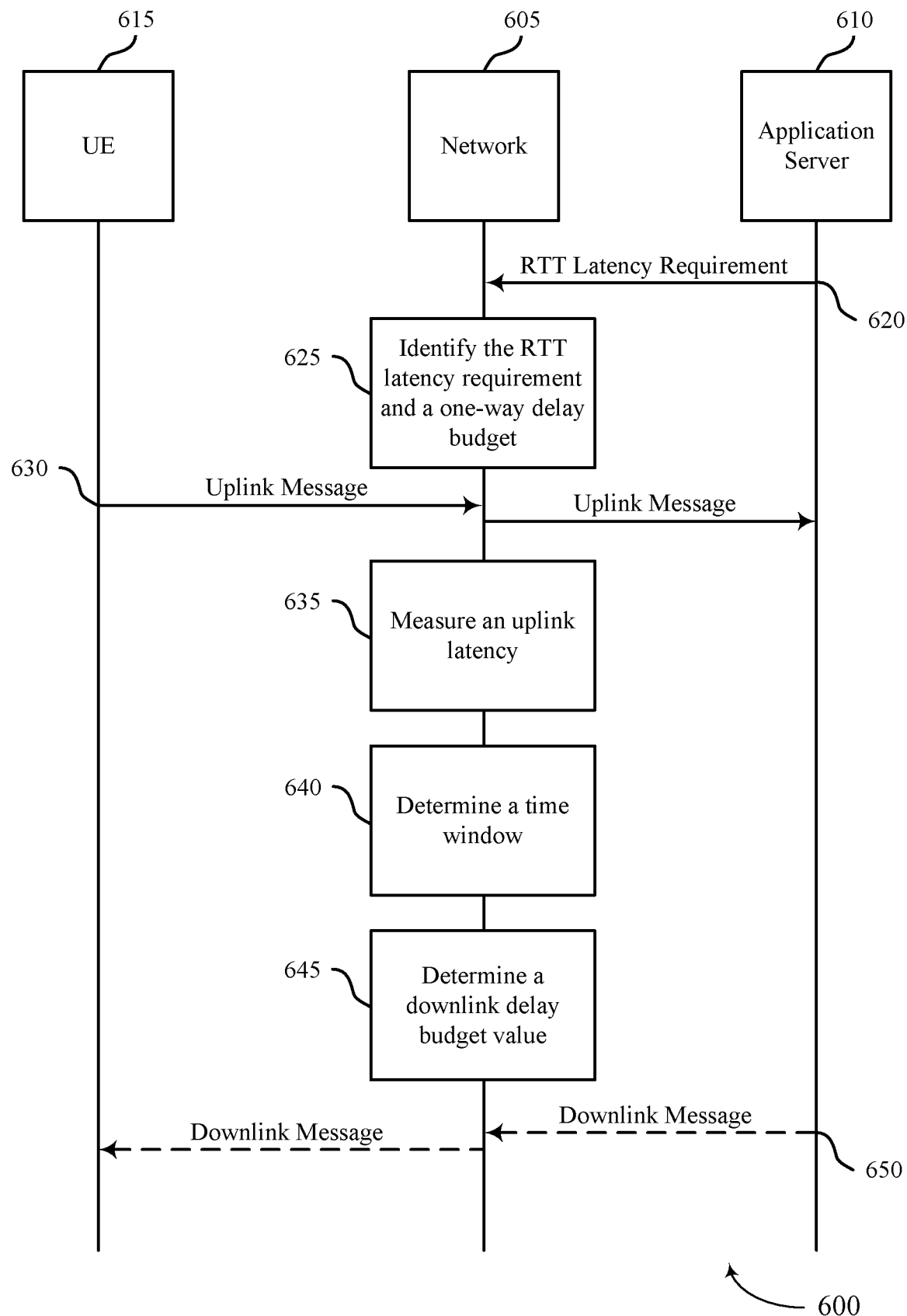

FIG. 6 illustrates an example of a process flow 600 that supports RTT as a latency performance indicator in accordance with aspects of the present disclosure. In some examples, the process flow 600 may implement one or more aspects of wireless communications systems 100 and the wireless communications system 200. For example, the process flow 600 may include example operations associated with a UE 615, which may be examples of the corresponding devices described with reference to FIGS. 1, 2, 3A, 3B, and 3C. The process flow 600 may also include example operations associated with a network 605, which may be an example a base station or a network core described with reference to FIGS. 1, 2, 3A, 3B, and 3C. The process flow 600 may further include example operations associated with an application server 610, which may be an example of an application server described with reference to FIGS. 1, 2, 3A, 3B, and 3C. The operations performed by the UE 615, the network 605, and the application server 610 may support improvements to communications between the UE 615 and the network 605, among other benefits.

In some examples, a wireless communications entity, such as the UE 615, the network 605 (e.g., a network core or a base station), or the application server 610 may determine a time window for transmitting messages (e.g., downlink messages or uplink messages) based on a range of distance parameter values (e.g., a back-end RTT range). For example, at 620, the application server 610 may transmit an RTT latency requirement to the network 605. At 625, the network 605 may identify the RTT latency requirement for an application of the application server 610 and a one-way delay budget that satisfies the RTT latency requirement.

At 630, the UE 615 may transmit an uplink message to the application server 610 via the network 605. That is, the network 505 may receive an uplink message from the UE 615 and transmit (e.g., forward) the uplink message to the application server 610. At 635, the network 605 may determine (e.g., measure) an uplink latency associated with the uplink message. At 640, the network 605 may determine a time window for transmitting a downlink message, responsive to the uplink message, to the UE 615. For example, the network 605 may identify a first RTT at the network 605. The first RTT may be a core RTT as described with reference to FIG. 4. For example, the first RTT may be associated with communications between a base station and a network core. The network 605 may receive an indication of a second RTT and the application server 610 and a processing delay for the application server 610 from the application server 610. The second RTT may be an example of a server RTT described with reference to FIG. 4. For example, the second RTT may be associated with communications between the network 605 (e.g., the network core) and the application server 610. Additionally or alternatively, the processing delay may be associated with the duration over which an uplink message is received at the application server 610 and downlink messages are generated (e.g., in response to the uplink message) at the application server 610. The network 605 may determine the back-end RTT range based on the first RTT and the indication (e.g., of the second RTT and the processing delay). The network 605 may determine the time window based on the uplink latency, the back-end RTT range, and the RTT latency requirement.

At 645, the network 605 may determine a downlink delay budget value that corresponds to the time window. The downlink delay budget value may be an example of a modified value of the one one-way directional delay budget described with reference to FIG. 5. At 650, the application server 610 may transmit the downlink message to the UE 615 via the network 605. The downlink message may be an example of the message that is associated with the modified value of the one one-way directional delay budget described with reference to FIG. 5. For example, the application server 610 may transmit the downlink message to the network 605 and the network 605 may forward the downlink message to the UE 615. In some examples, the network 605 may forward (e.g., transmit) the downlink message during the time window and in accordance with the downlink delay budget value. As such, the network 605 (e.g., a base station or a network core) may reduce latency in communications between the UE 615 and the network 605.

Figure 7:
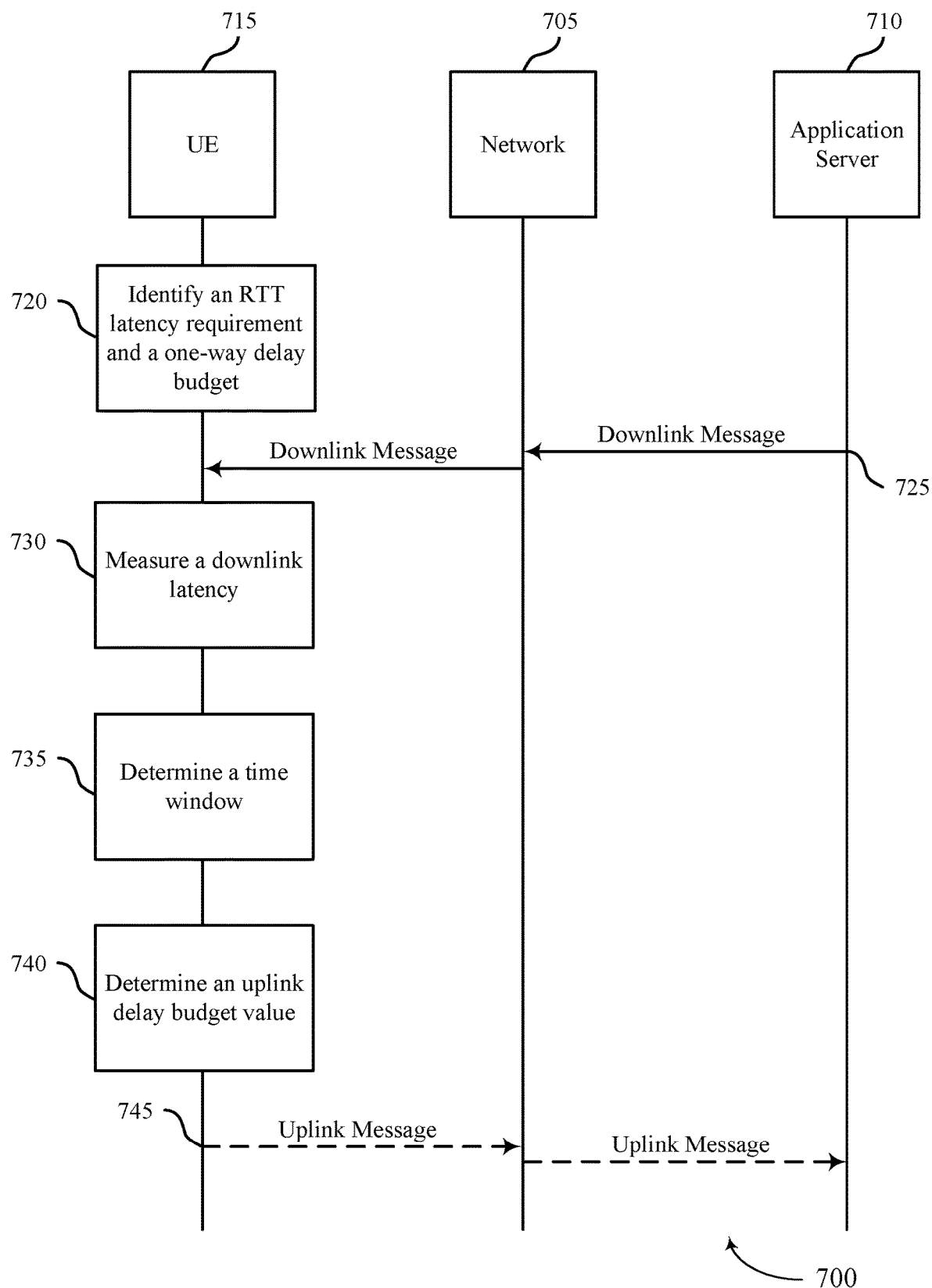

FIG. 7 illustrates an example of a process flow 700 that supports RTT as a latency performance indicator in accordance with aspects of the present disclosure. In some examples, the process flow 700 may implement one or more aspects of wireless communications systems 100 and the wireless communications system 200. For example, the process flow 700 may include example operations associated with a UE 715, which may be examples of the corresponding devices described with reference to FIGS. 1, 2, 3A, 3B, and 3C. The process flow 700 may also include example operations associated with a network 705, which may be an example a base station or a network core described with reference to FIGS. 1, 2, 3A, 3B, and 3C. The process flow 700 may further include example operations associated with an application server 710, which may be an example of an application server described with reference to FIGS. 1, 2, 3A, 3B, and 3C. The operations performed by the UE 715, the network 705, and the application server 710 may support improvements to communications between the UE 715 and the network 705, among other benefits.

The UE 715 may determine a one-way directional delay budget (e.g., an uplink delay budget) based on a specified RTT latency requirement. For example, at 720, the UE 715 may identify an RTT latency requirement for an application of the application server 710 and a one-way (e.g., directional) delay budget that satisfies the RTT latency requirement. At 725, the application server 710 may transmit a downlink message to the UE 715 via the network 705. At 730, the UE 715 may measure a downlink latency (e.g., as indicated via a 5G DL latency IE) of the received downlink message. At 735, the UE 715 may determine a time window for transmitting uplink messages (e.g., responsive to the receive downlink message). In some examples, the UE 715 may use the time window for transmitting uplink messages as a parameter for adjusting the uplink delay budget.

At 740, the UE 715 may determine an uplink delay budget value that corresponds to the time window. In some examples, the UE 715 may use the time window (e.g., for transmitting the uplink messages) to adjust the uplink delay such that the RTT latency requirement (e.g., a target RTT value) may be satisfied. Additionally or alternatively, the UE 715 may control the uplink delay budget. For example, the UE 715 may control the uplink delay budget (e.g., via prioritization of uplink message transmissions) to reduce latency in uplink communications. In some examples, the UE 715 may, in an existing grant, determine to transmit (e.g., prioritize the transmission of) uplink messages (e.g., uplink data packet) associated with latency-sensitive uplink traffic (e.g., uplink messages with an increased latency sensitivity) rather than uplink messages that may not be latency-sensitive or that may have a reduced latency-sensitivity compared to the latency-sensitive uplink messages.

Additionally or alternatively, the UE 715 may send a scheduling request (e.g., over the physical uplink control channel (PUCCH) to the network 705) to request uplink resources to send the latency-sensitive uplink messages. In some examples, the windows for transmitting uplink messages may be reduced compared to windows for transmitting downlink messages. For example, delays between the reception of a downlink message (e.g., from the network 705) and transmission of the corresponding uplink messages (e.g., at the UE 715) may be reduced and, in some examples, controlled or monitored by the UE 715 (e.g., by an integrated UE/application). At 745, the UE 715 may transmit the uplink message to the application server 710 via the network 705. In some examples, the UE 715 may transmit the uplink message over the time window and according to the uplink delay budget. As such, the UE 715 may reduce latency in communications between the UE 715 and the network 705.

Figure 8:
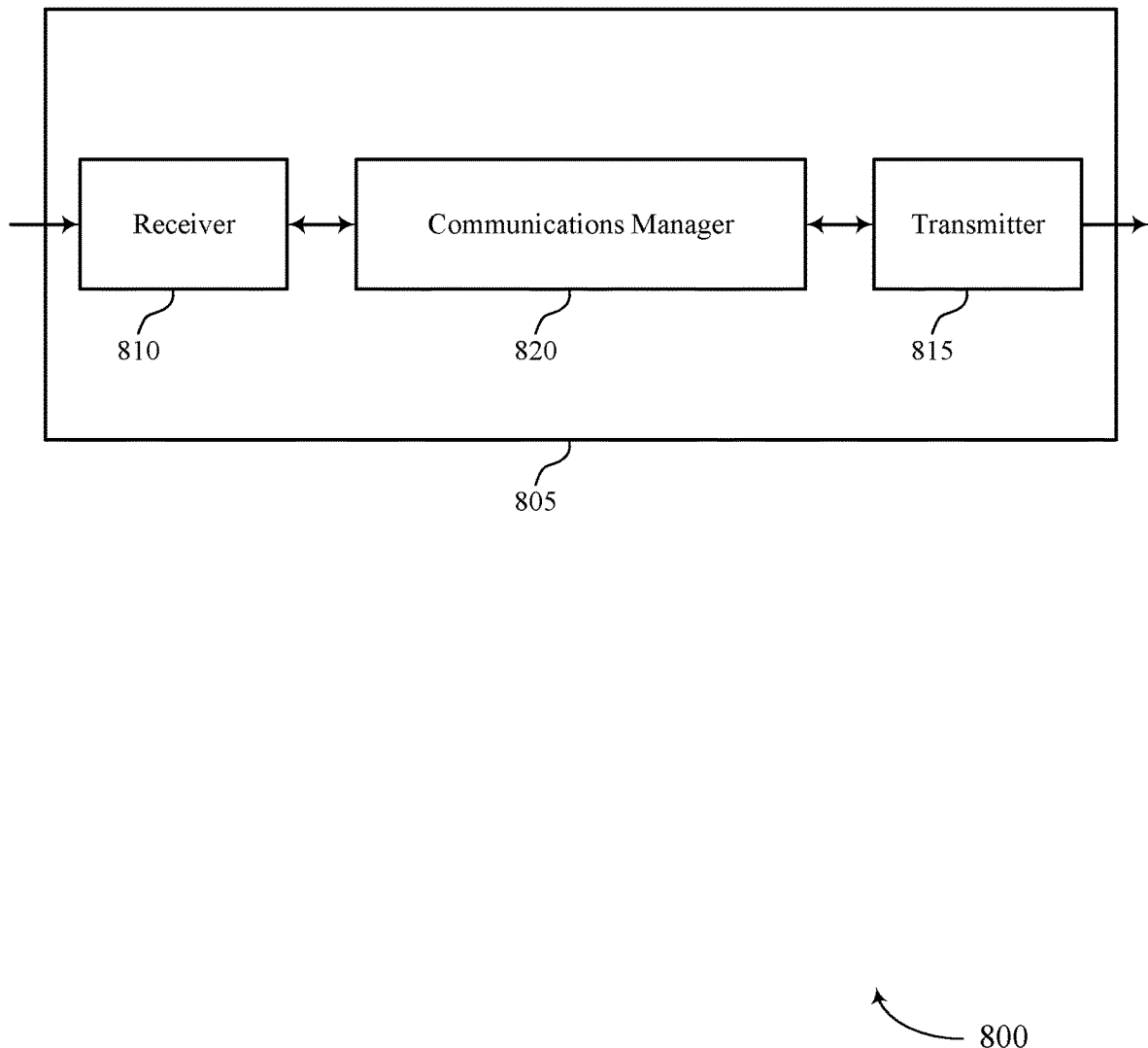
FIGS. 8 and 9 show block diagrams of devices that support RTT as a latency performance indicator in accordance with aspects of the present disclosure.

FIG. 8 shows a block diagram 800 of a device 805 that supports RTT as a latency performance indicator in accordance with aspects of the present disclosure. The device 805 may be an example of aspects of a wireless communications entity (e.g., a base station 105, a network core 130, a UE 115, or an application server) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RTT as a latency performance indicator). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RTT as a latency performance indicator). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of RTT as a latency performance indicator as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a wireless communications entity (e.g., the device 805) in accordance with examples as disclosed herein. For example, the communications manager 820 may be configured as or otherwise support a means for identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station. The communications manager 820 may be configured as or otherwise support a means for modifying a value of the at least one one-way directional delay budget for the wireless communications between the UE and the base station. The communications manager 820 may be configured as or otherwise support a means for transmitting a message that is associated with the modified value of the at least one one-way directional delay budget.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing and more efficient utilization of communication resources, among other benefits.

Figure 9:
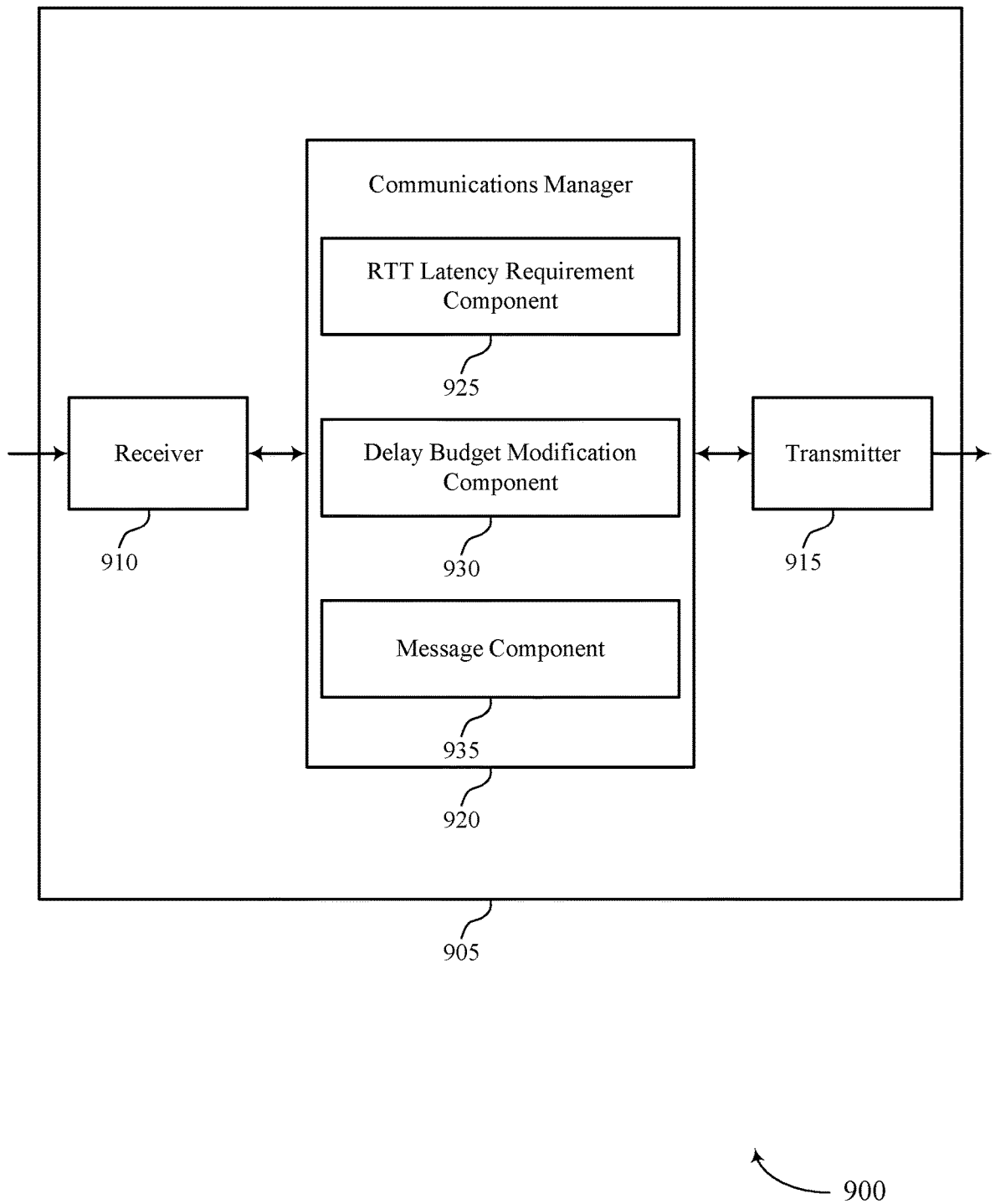

FIG. 9 shows a block diagram 900 of a device 905 that supports RTT as a latency performance indicator in accordance with aspects of the present disclosure. The device 905 may be an example of aspects of a device 805 or a wireless communications entity (e.g., a base station 105, a network core 130, a UE 115, or an application server) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to RTT as a latency performance indicator). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to RTT as a latency performance indicator). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of RTT as a latency performance indicator as described herein. For example, the communications manager 920 may include an RTT latency requirement component 925, a delay budget modification component 930, a message component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a wireless communications entity (e.g., the device 905) in accordance with examples as disclosed herein. The RTT latency requirement component 925 may be configured as or otherwise support a means for identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station. The delay budget modification component 930 may be configured as or otherwise support a means for modifying a value of the at least one one-way directional delay budget for the wireless communications between the UE and the base station. The message component 935 may be configured as or otherwise support a means for transmitting a message that is associated with the modified value of the at least one one-way directional delay budget.

Figure 10:
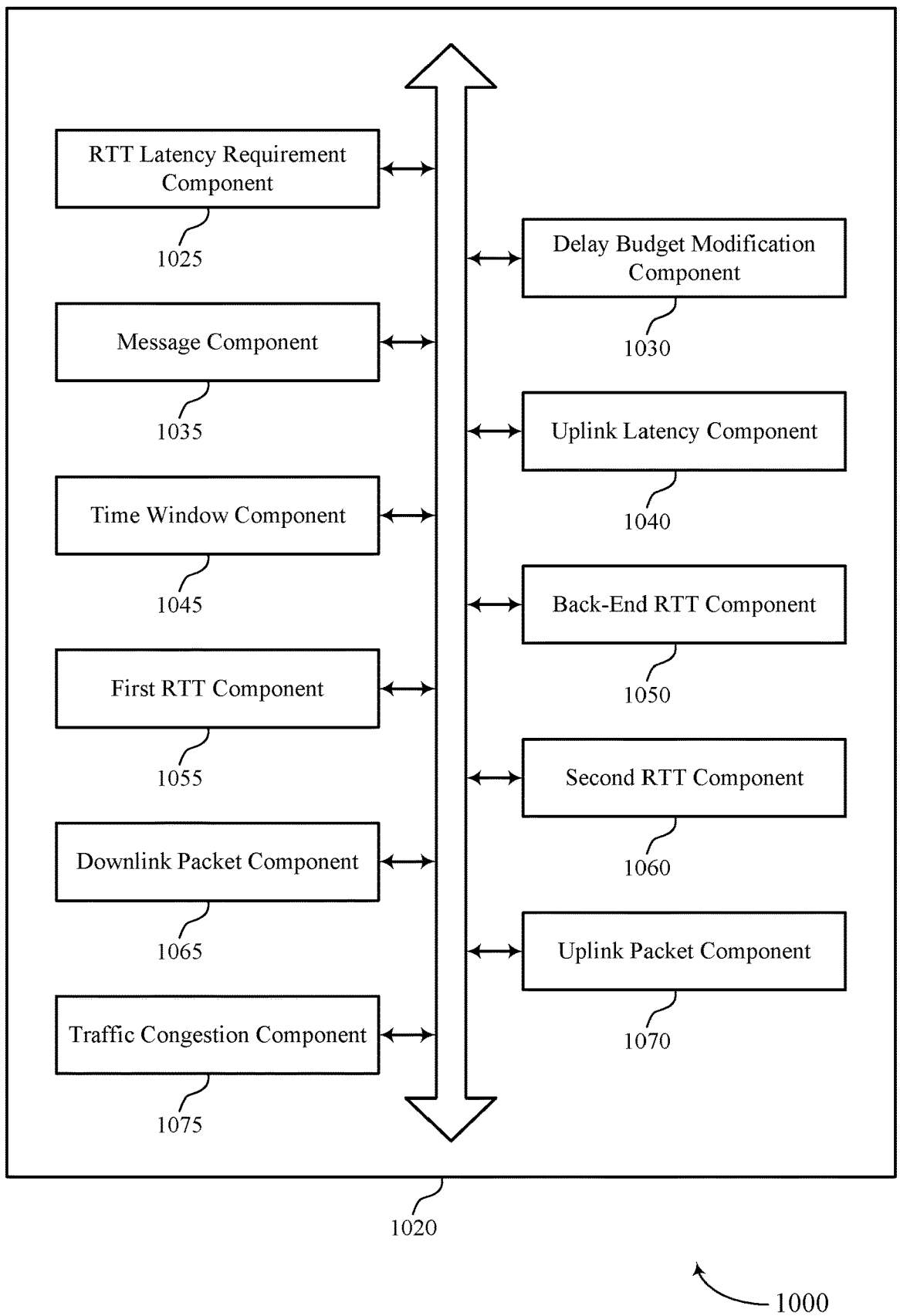
FIG. 10 shows a block diagram of a communications manager that supports RTT as a latency performance indicator in accordance with aspects of the present disclosure.

FIG. 10 shows a block diagram 1000 of a communications manager 1020 that supports RTT as a latency performance indicator in accordance with aspects of the present disclosure. The communications manager 1020 may be an example of aspects of a communications manager 820, a communications manager 920, or both, as described herein. The communications manager 1020, or various components thereof, may be an example of means for performing various aspects of RTT as a latency performance indicator as described herein. For example, the communications manager 1020 may include an RTT latency requirement component 1025, a delay budget modification component 1030, a message component 1035, an uplink latency component 1040, a time window component 1045, a back-end RTT component 1050, a first RTT component 1055, a second RTT component 1060, a downlink packet component 1065, an uplink packet component 1070, a traffic congestion component 1075, or any combination thereof. Each of these components may communicate, directly or indirectly, with one another (e.g., via one or more buses).

The communications manager 1020 may support wireless communication at a wireless communications entity (e.g., a base station 105, a network core 130, a UE 115, or an application server) in accordance with examples as disclosed herein. The RTT latency requirement component 1025 may be configured as or otherwise support a means for identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station. The delay budget modification component 1030 may be configured as or otherwise support a means for modifying a value of the at least one one-way directional delay budget for the wireless communications between the UE and the base station. The message component 1035 may be configured as or otherwise support a means for transmitting a message that is associated with the modified value of the at least one one-way directional delay budget.

In some examples, to support identifying the RTT latency requirement and the at least one one-way directional delay budget, the RTT latency requirement component 1025 may be configured as or otherwise support a means for receiving the RTT latency requirement from either the application server or from a network core that is in communication with the application server. In some examples, to support identifying the RTT latency requirement and the at least one one-way directional delay budget, the RTT latency requirement component 1025 may be configured as or otherwise support a means for receiving a recommended uplink delay budget value and a recommended downlink delay budget value from either the application server or from the network core.

In some examples, to support modifying the value of the at least one one-way directional delay budget, the traffic congestion component 1075 may be configured as or otherwise support a means for monitoring for traffic congestion in the wireless communications between the UE and the base station. In some examples, to support modifying the value of the at least one one-way directional delay budget, the traffic congestion component 1075 may be configured as or otherwise support a means for reporting the traffic congestion to the network core. In some examples, to support modifying the value of the at least one one-way directional delay budget, the delay budget modification component 1030 may be configured as or otherwise support a means for receiving, from the network core, the modified value of the at least one one-way directional delay budget in the form of at least one of a modified recommended uplink delay budget or a modified recommended downlink delay budget.

In some examples, to support identifying the RTT latency requirement and the at least one one-way directional delay budget, the RTT latency requirement component 1025 may be configured as or otherwise support a means for determining, based on the RTT latency requirement, an initial uplink delay budget value and an initial downlink delay budget value.

In some examples, to support modifying the value of the at least one one-way directional delay budget, the traffic congestion component 1075 may be configured as or otherwise support a means for monitoring for traffic congestion in the wireless communications between the UE and the base station to determine whether the initial uplink delay budget value or the initial downlink delay budget value is satisfied. In some examples, to support modifying the value of the at least one one-way directional delay budget, the delay budget modification component 1030 may be configured as or otherwise support a means for determining, based on the traffic congestion, the modified value of the at least one one-way directional delay budget in the form of at least one of a modified uplink delay budget or a modified downlink delay budget.

In some examples, to support modifying the value of the at least one one-way directional delay budget, the message component 1035 may be configured as or otherwise support a means for receiving an uplink message from the UE, the uplink message associated with an uplink latency, where the base station is the wireless communications entity. In some examples, to support modifying the value of the at least one one-way directional delay budget, the uplink latency component 1040 may be configured as or otherwise support a means for determining, based on the uplink latency and the RTT latency requirement, a time window for transmitting, responsive to the uplink message, a downlink message to the UE. In some examples, to support modifying the value of the at least one one-way directional delay budget, the delay budget modification component 1030 may be configured as or otherwise support a means for determining a downlink delay budget value that corresponds to the time window, where the downlink delay budget value is a modified value of the at least one one-way directional delay budget.

In some examples, the message component 1035 may be configured as or otherwise support a means for transmitting the downlink message to the UE during the time window and in accordance with the downlink delay budget value, where the downlink message is the message that is associated with the modified value of the at least one one-way directional delay budget.

In some examples, to support determining the time window for transmitting the downlink message to the UE, the first RTT component 1055 may be configured as or otherwise support a means for identifying a first RTT for transmissions between the base station and a network core. In some examples, to support determining the time window for transmitting the downlink message to the UE, the second RTT component 1060 may be configured as or otherwise support a means for receiving an indication of a second RTT for transmissions between the network core and the application server and a processing delay of the application server, or a combination of the second RTT and the processing delay. In some examples, to support determining the time window for transmitting the downlink message to the UE, the back-end RTT component 1050 may be configured as or otherwise support a means for determining a back-end RTT range that is based on the first RTT and the indication. In some examples, to support determining the time window for transmitting the downlink message to the UE, the time window component 1045 may be configured as or otherwise support a means for determining the time window based on the uplink latency, the back-end RTT range, and the RTT latency requirement.

In some examples, to support determining the time window based on the uplink latency, the back-end RTT range, and the RTT latency requirement, the time window component 1045 may be configured as or otherwise support a means for setting the time window independently for each uplink message received at the base station during the wireless communications.

In some examples, to support setting the time window independently for each uplink message, the time window component 1045 may be configured as or otherwise support a means for identifying a start time for the time window based on the uplink latency and a minimum value of the back-end RTT range. In some examples, to support setting the time window independently for each uplink message, the time window component 1045 may be configured as or otherwise support a means for identifying an end time for the time window based on the uplink latency and a maximum value of the back-end RTT range.

In some examples, to support determining the downlink delay budget value that corresponds to the time window, the time window component 1045 may be configured as or otherwise support a means for determining a minimum downlink delay budget value for the time window when multiple time windows for corresponding uplink messages overlap.

In some examples, to support setting the time window independently for each uplink message, the time window component 1045 may be configured as or otherwise support a means for identifying a start time for the time window based on the uplink latency and a mean value of the back-end RTT range. In some examples, to support setting the time window independently for each uplink message, the time window component 1045 may be configured as or otherwise support a means for identifying an end time for the time window based on a start time of a next time window, which is based on a next uplink latency for a next uplink message from the UE and a next mean value of a next back-end RTT range, where the time window and the next time window do not overlap in time.

In some examples, to support determining the time window for transmitting the downlink message to the UE, the time window component 1045 may be configured as or otherwise support a means for determining the time window for a set of multiple uplink messages, where the uplink latency used for determining the time window is selected based on an operation that pertains to all of the set of multiple uplink messages.

In some examples, the RTT latency requirement component 1025 may be configured as or otherwise support a means for receiving an indication that the RTT latency requirement and the one-way direction delay budget pertain to specific traffic flow types. In some examples, the value of the at least one one-way directional delay budget that is modified is one of a downlink ADB value instead of a downlink PDB value.

In some examples, to support modifying the value of the at least one one-way directional delay budget, the message component 1035 may be configured as or otherwise support a means for receiving a downlink message from the base station, the downlink message associated with a downlink latency, where the UE is the wireless communications entity. In some examples, to support modifying the value of the at least one one-way directional delay budget, the time window component 1045 may be configured as or otherwise support a means for determining, based on the downlink latency and the RTT latency requirement, a time window for transmitting, responsive to the downlink message, an uplink message to the base station. In some examples, to support modifying the value of the at least one one-way directional delay budget, the delay budget modification component 1030 may be configured as or otherwise support a means for determining an uplink delay budget value that corresponds to the time window, where the uplink delay budget value is a modified value of the at least one one-way directional delay budget.

In some examples, to support modifying the value of the at least one one-way directional delay budget, the message component 1035 may be configured as or otherwise support a means for receiving an uplink message from the UE, the uplink message associated with an uplink latency, where the base station is the wireless communications entity. In some examples, to support modifying the value of the at least one one-way directional delay budget, the back-end RTT component 1050 may be configured as or otherwise support a means for determining a back-end RTT for round-trip communications between the base station and the application server. In some examples, to support modifying the value of the at least one one-way directional delay budget, the delay budget modification component 1030 may be configured as or otherwise support a means for determining a downlink delay budget value for a downlink message responsive to the uplink message, where the downlink delay budget value is determined based on the uplink latency and the back-end RTT, and where the downlink message is the message that is associated with the modified value of the at least one one-way directional delay budget.

In some examples, the downlink packet component 1065 may be configured as or otherwise support a means for receiving a time-stamped downlink packet from the application server, the time-stamped downlink packet associated with the downlink message. In some examples, the back-end RTT component 1050 may be configured as or otherwise support a means for determining, a back-end downlink latency based on a time-stamp of the time-stamped downlink packet and a time at which the time-stamped downlink packet is received at the base station, where determining the back-end RTT for the round-trip communications between the base station and the application server is based on the back-end downlink latency.

In some examples, to support determining the back-end RTT for the round-trip communications between the base station and the application server, the uplink packet component 1070 may be configured as or otherwise support a means for forwarding a time-stamped uplink packet to the application server, the time-stamped uplink packet associated with the uplink message. In some examples, to support determining the back-end RTT for the round-trip communications between the base station and the application server, the downlink packet component 1065 may be configured as or otherwise support a means for receiving a time-stamped downlink packet from the application server, where a time-stamp on the time-stamped downlink packet is copied from the time-stamped uplink packet. In some examples, to support determining the back-end RTT for the round-trip communications between the base station and the application server, the back-end RTT component 1050 may be configured as or otherwise support a means for determining the back-end RTT based on the time-stamp and a time at which the time-stamped downlink packet is received at the base station.

In some examples, the wireless communications entity is the application server. In some examples, the message that is associated with the modified value of the at least one one-way directional delay budget is transmitted from the application server to a network core and includes indications of a downlink delay budget value and an uplink delay budget value.

Figure 11:
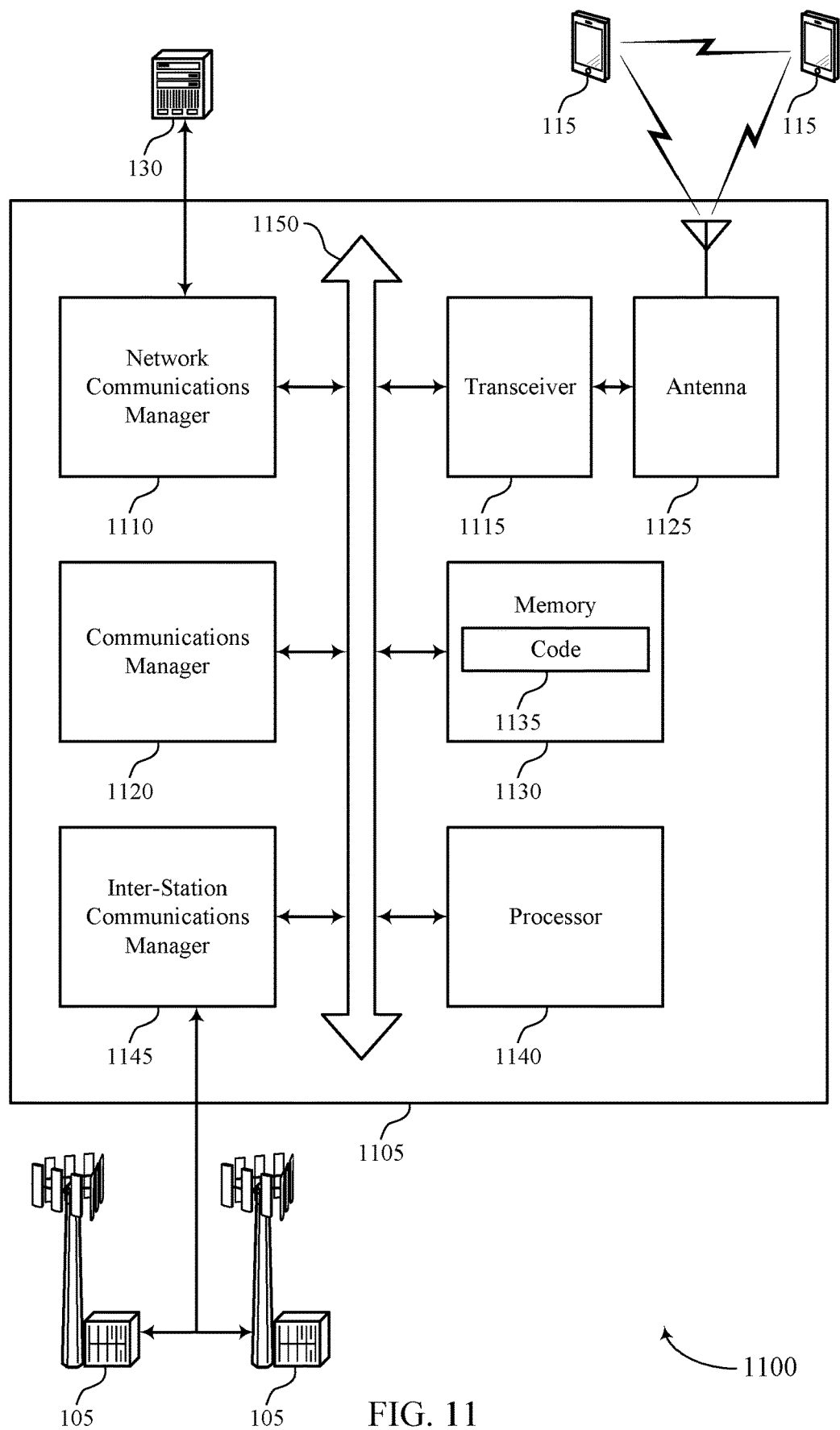
FIG. 11 shows a diagram of a system including a device that supports RTT as a latency performance indicator in accordance with aspects of the present disclosure.

FIG. 11 shows a diagram of a system 1100 including a device 1105 that supports RTT as a latency performance indicator in accordance with aspects of the present disclosure. The device 1105 may be an example of or include the components of a device 805, a device 905, or a wireless communications entity (e.g., a base station 105, a network core 130, a UE 115, or an application server) as described herein. The device 1105 may communicate with one or more base stations 105, UEs 115, or any combination thereof, via wired or wireless communication links. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a network core 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting RTT as a latency performance indicator). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a wireless communications entity in accordance with examples as disclosed herein. For example, the communications manager 1120 may be configured as or otherwise support a means for identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station. The communications manager 1120 may be configured as or otherwise support a means for modifying a value of the at least one one-way directional delay budget for the wireless communications between the UE and the base station. The communications manager 1120 may be configured as or otherwise support a means for transmitting a message that is associated with the modified value of the at least one one-way directional delay budget.

By including or configuring the communications manager 1120 in accordance with examples as described herein, the device 1105 may support techniques for improved communication reliability, reduced latency, improved user experience related to reduced processing, reduced power consumption, more efficient utilization of communication resources, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of RTT as a latency performance indicator as described herein, or the processor 1140 and the memory 1130 may be otherwise configured to perform or support such operations.

Figure 12:
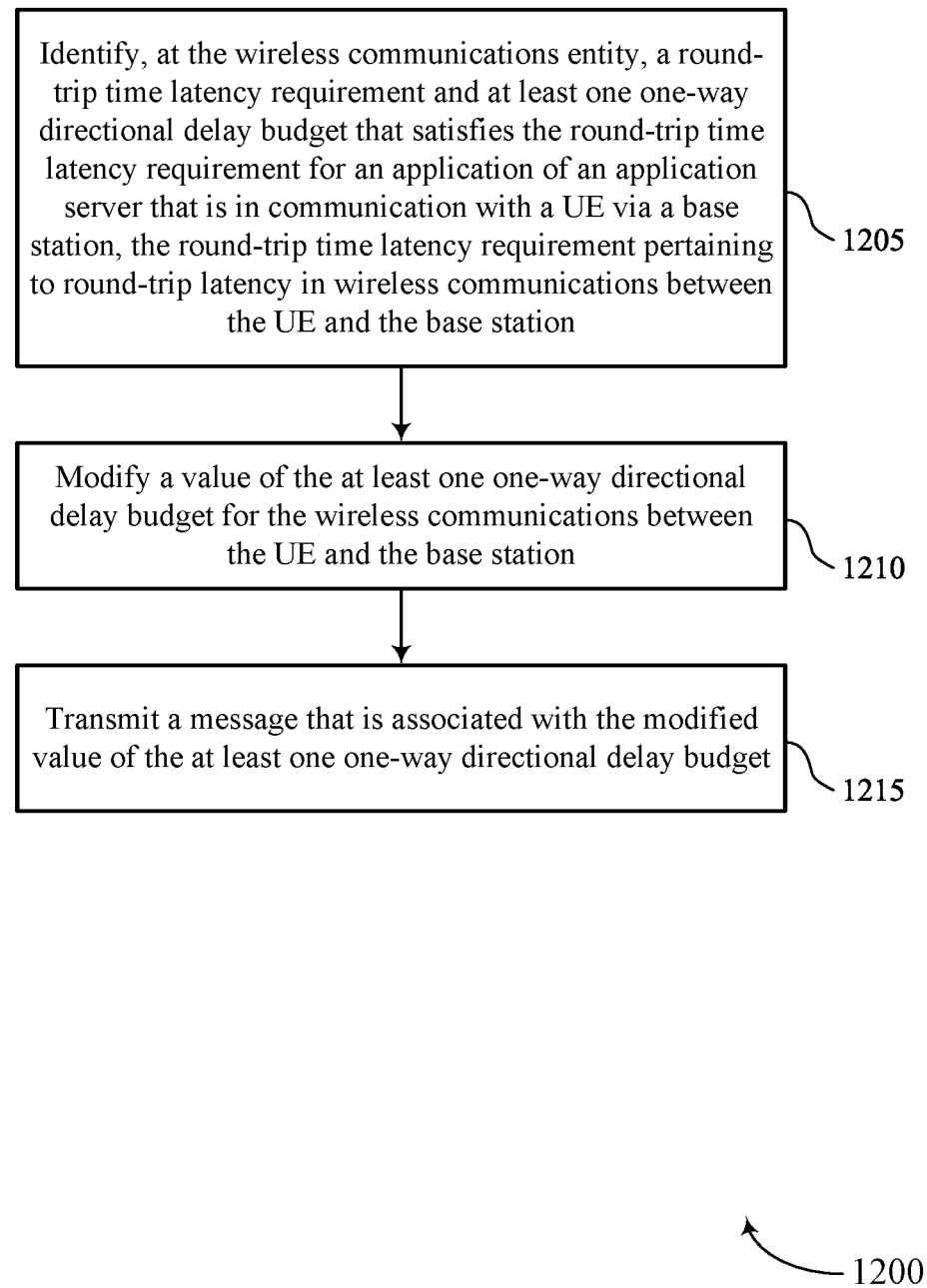
FIGS. 12 and 13 show flowcharts illustrating methods that support RTT as a latency performance indicator in accordance with aspects of the present disclosure.

FIG. 12 shows a flowchart illustrating a method 1200 that supports RTT as a latency performance indicator in accordance with aspects of the present disclosure. The operations of the method 1200 may be implemented by a wireless communications entity (e.g., a base station 105, a network core 130, a UE 115, or an application server) or its components as described herein. For example, the operations of the method 1200 may be performed by a wireless communications entity as described with reference to FIGS. 1 through 11. In some examples, a wireless communications entity may execute a set of instructions to control the functional elements of the wireless communications entity to perform the described functions. Additionally or alternatively, the wireless communications entity may perform aspects of the described functions using special-purpose hardware.

At 1205, the method may include identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station. The operations of 1205 may be performed in accordance with examples as disclosed herein. In some examples, aspects of the operations of 1205 may be performed by an RTT latency requirement component 1025 as described with reference to FIG. 10.

At 1210, the method may include modifying a value of the at least one one-way directional delay budget for the wireless communications between the UE and the base station. The operations of 1210 may be performed in accordance with examples as disclosed herein. In some examples, aspects of the operations of 1210 may be performed by a delay budget modification component 1030 as described with reference to FIG. 10.

At 1215, the method may include transmitting a message that is associated with the modified value of the at least one one-way directional delay budget. The operations of 1215 may be performed in accordance with examples as disclosed herein. In some examples, aspects of the operations of 1215 may be performed by a message component 1035 as described with reference to FIG. 10.

Figure 13:
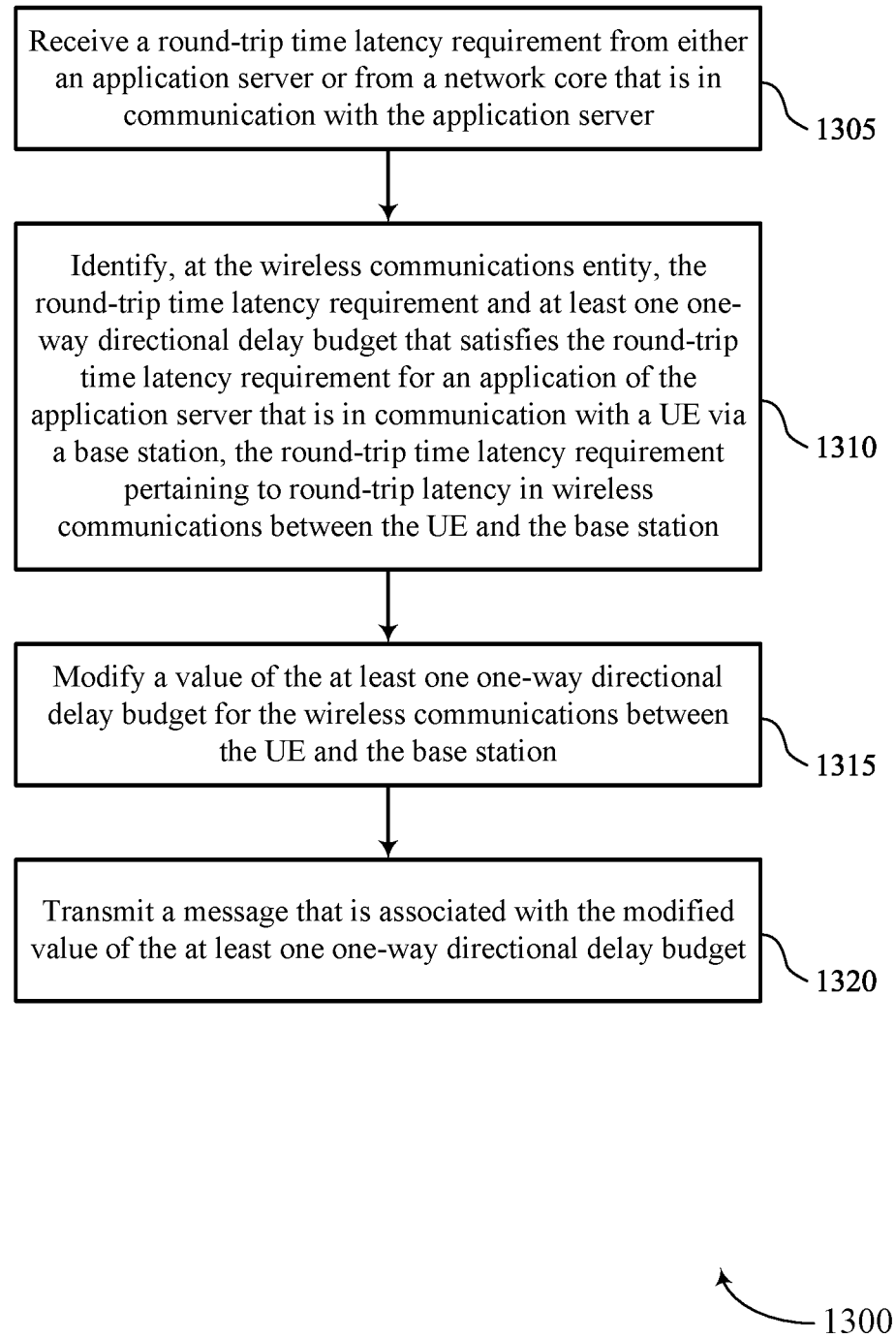

FIG. 13 shows a flowchart illustrating a method 1300 that supports RTT as a latency performance indicator in accordance with aspects of the present disclosure. The operations of the method 1300 may be implemented by a wireless communications entity (e.g., a base station 105, a network core 130, a UE 115, or an application server) or its components as described herein. For example, the operations of the method 1300 may be performed by a wireless communications entity as described with reference to FIGS. 1 through 11. In some examples, a wireless communications entity may execute a set of instructions to control the functional elements of the wireless communications entity to perform the described functions. Additionally or alternatively, the wireless communications entity may perform aspects of the described functions using special-purpose hardware.

At 1305, the method may include receiving an RTT latency requirement from either an application server or from a network core that is in communication with the application server. The operations of 1305 may be performed in accordance with examples as disclosed herein. In some examples, aspects of the operations of 1305 may be performed by an RTT latency requirement component 1025 as described with reference to FIG. 10.

At 1310, the method may include identifying, at the wireless communications entity, the RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station. The operations of 1310 may be performed in accordance with examples as disclosed herein. In some examples, aspects of the operations of 1310 may be performed by an RTT latency requirement component 1025 as described with reference to FIG. 10.

At 1315, the method may include modifying a value of the at least one one-way directional delay budget for the wireless communications between the UE and the base station. The operations of 1315 may be performed in accordance with examples as disclosed herein. In some examples, aspects of the operations of 1315 may be performed by a delay budget modification component 1030 as described with reference to FIG. 10.

At 1320, the method may include transmitting a message that is associated with the modified value of the at least one one-way directional delay budget. The operations of 1320 may be performed in accordance with examples as disclosed herein. In some examples, aspects of the operations of 1320 may be performed by a message component 1035 as described with reference to FIG. 10.

The following provides an overview of aspects of the present disclosure:

Aspect 1: A method for wireless communication at a wireless communications entity, comprising: identifying, at the wireless communications entity, an RTT latency requirement and at least one one-way directional delay budget that satisfies the RTT latency requirement for an application of an application server that is in communication with a UE via a base station, the RTT latency requirement pertaining to round-trip latency in wireless communications between the UE and the base station; modifying a value of the at least one one-way directional delay budget for the wireless communications between the UE and the base station; and transmitting a message that is associated with the modified value of the at least one one-way directional delay budget.

Aspect 2: The method of aspect 1, wherein identifying the RTT latency requirement and the at least one one-way directional delay budget further comprises: receiving the RTT latency requirement from either the application server or from a network core that is in communication with the application server.

Aspect 3: The method of aspect 2, wherein identifying the RTT latency requirement and the at least one one-way directional delay budget further comprises: receiving a recommended uplink delay budget value and a recommended downlink delay budget value from either the application server or from the network core.

Aspect 4: The method of aspect 3, wherein modifying the value of the at least one one-way directional delay budget further comprises: monitoring for traffic congestion in the wireless communications between the UE and the base station; reporting the traffic congestion to the network core;

and receiving, from the network core, the modified value of the at least one one-way directional delay budget in the form of at least one of a modified recommended uplink delay budget or a modified recommended downlink delay budget.

Aspect 5: The method of aspect 2, wherein identifying the RTT latency requirement and the at least one one-way directional delay budget further comprises: determining, based at least in part on the RTT latency requirement, an initial uplink delay budget value and an initial downlink delay budget value.

Aspect 6: The method of aspect 5, wherein modifying the value of the at least one one-way directional delay budget further comprises: monitoring for traffic congestion in the wireless communications between the UE and the base station to determine whether the initial uplink delay budget value or the initial downlink delay budget value is satisfied; and determining, based at least in part on the traffic congestion, the modified value of the at least one one-way directional delay budget in the form of at least one of a modified uplink delay budget or a modified downlink delay budget.

Aspect 7: The method of any of aspects 1 through 6, wherein modifying the value of the at least one one-way directional delay budget further comprises: receiving an uplink message from the UE, the uplink message associated with an uplink latency, wherein the base station is the wireless communications entity; determining, based at least in part on the uplink latency and the RTT latency requirement, a time window for transmitting, responsive to the uplink message, a downlink message to the UE; and determining a downlink delay budget value that corresponds to the time window, wherein the downlink delay budget value is a modified value of the at least one one-way directional delay budget.

Aspect 8: The method of aspect 7, further comprising: transmitting the downlink message to the UE during the time window and in accordance with the downlink delay budget value, wherein the downlink message is the message that is associated with the modified value of the at least one one-way directional delay budget.

Aspect 9: The method of any of aspects 7 through 8, wherein determining the time window for transmitting the downlink message to the UE further comprises: identifying a first RTT for transmissions between the base station and a network core; receiving an indication of a second RTT for transmissions between the network core and the application server and a processing delay of the application server, or a combination of the second RTT and the processing delay; determining a back-end RTT range that is based on the first RTT and the indication; and determining the time window based at least in part on the uplink latency, the back-end RTT range, and the RTT latency requirement.

Aspect 10: The method of aspect 9, wherein determining the time window based at least in part on the uplink latency, the back-end RTT range, and the RTT latency requirement further comprises: setting the time window independently for each uplink message received at the base station during the wireless communications.

Aspect 11: The method of aspect 10, wherein setting the time window independently for each uplink message further comprises: identifying a start time for the time window based at least in part on the uplink latency and a minimum value of the back-end RTT range; and identifying an end time for the time window based at least in part on the uplink latency and a maximum value of the back-end RTT range.

Aspect 12: The method of aspect 11, wherein determining the downlink delay budget value that corresponds to the time window further comprises: determining a minimum downlink delay budget value for the time window when multiple time windows for corresponding uplink messages overlap.

Aspect 13: The method of aspect 10, wherein setting the time window independently for each uplink message further comprises: identifying a start time for the time window based at least in part on the uplink latency and a mean value of the back-end RTT range; and identifying an end time for the time window based at least in part on a start time of a next time window, which is based on a next uplink latency for a next uplink message from the UE and a next mean value of a next back-end RTT range, wherein the time window and the next time window do not overlap in time.

Aspect 14: The method of any of aspects 7 through 9, wherein determining the time window for transmitting the downlink message to the UE further comprises: determining the time window for a plurality of uplink messages, wherein the uplink latency used for determining the time window is selected based on an operation that pertains to all of the plurality of uplink messages.

Aspect 15: The method of any of aspects 7 through 14, further comprising: receiving an indication that the RTT latency requirement and the one-way direction delay budget pertain to specific traffic flow types.

Aspect 16: The method of any of aspects 1 through 15, wherein the value of the at least one one-way directional delay budget that is modified is one of a downlink ADB value instead of a downlink PDB value.

Aspect 17: The method of aspect 1, wherein modifying the value of the at least one one-way directional delay budget further comprises: receiving a downlink message from the base station, the downlink message associated with a downlink latency, wherein the UE is the wireless communications entity; determining, based at least in part on the downlink latency and the RTT latency requirement, a time window for transmitting, responsive to the downlink message, an uplink message to the base station; and determining an uplink delay budget value that corresponds to the time window, wherein the uplink delay budget value is a modified value of the at least one one-way directional delay budget.

Aspect 18: The method of any of aspects 1 through 16, wherein modifying the value of the at least one one-way directional delay budget further comprises: receiving an uplink message from the UE, the uplink message associated with an uplink latency, wherein the base station is the wireless communications entity; determining a back-end RTT for round-trip communications between the base station and the application server; and determining a downlink delay budget value for a downlink message responsive to the uplink message, wherein the downlink delay budget value is determined based at least in part on the uplink latency and the back-end RTT, and wherein the downlink message is the message that is associated with the modified value of the at least one one-way directional delay budget.

Aspect 19: The method of aspect 18, further comprising: receiving a time-stamped downlink packet from the application server, the time-stamped downlink packet associated with the downlink message; and determining, a back-end downlink latency based at least in part on a time-stamp of the time-stamped downlink packet and a time at which the time-stamped downlink packet is received at the base station, wherein determining the back-end RTT for the round-trip communications between the base station and the application server is based at least in part on the back-end downlink latency.

Aspect 20: The method of aspect 18, wherein determining the back-end RTT for the round-trip communications between the base station and the application server further comprises: forwarding a time-stamped uplink packet to the application server, the time-stamped uplink packet associated with the uplink message; receiving a time-stamped downlink packet from the application server, wherein a time-stamp on the time-stamped downlink packet is copied from the time-stamped uplink packet; and determining the back-end RTT based on the time stamp and a time at which the time-stamped downlink packet is received at the base station.

Aspect 21: The method of aspect 1, wherein the wireless communications entity is the application server, and the message that is associated with the modified value of the at least one one-way directional delay budget is transmitted from the application server to a network core and includes indications of a downlink delay budget value and an uplink delay budget value.

Aspect 22: An apparatus for wireless communication, comprising a processor; memory coupled with the processor; and instructions stored in the memory and executable by the processor to cause the apparatus to perform a method of any of aspects 1 through 21.

Aspect 23: An apparatus for wireless communication, comprising at least one means for performing a method of any of aspects 1 through 21.

Aspect 24: A non-transitory computer-readable medium storing code for wireless communication at a wireless communications entity, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless communications entity, comprising:
    identifying, at the wireless communications entity, a round-trip time latency requirement for an application of an application server that is in communication with a user equipment (UE) via a base station, the round-trip time latency requirement pertaining to round-trip latency in wireless communications between the UE and the base station;
    identifying, at the wireless communications entity, at least one of a downlink delay budget or an uplink delay budget for the wireless communications between the UE and the base station;
    modifying a value of the downlink delay budget or the uplink delay budget for the wireless communications between the UE and the base station, wherein a summation of the downlink delay budget and the uplink delay budget satisfies the round-trip time latency requirement based at least in part on the modified value of the downlink delay budget or the uplink delay budget; and
    transmitting a message that is associated with the modified value of the downlink delay budget or the uplink delay budget.

2. The method of claim 1, wherein identifying the round-trip time latency requirement further comprises:
    receiving the round-trip time latency requirement from either the application server or from a network core that is in communication with the application server.

3. The method of claim 2, wherein identifying at least one of the downlink delay budget or the uplink delay budget further comprises:
    receiving a recommended uplink delay budget value and a recommended downlink delay budget value from either the application server or from the network core.

4. The method of claim 3, wherein modifying the value of the downlink delay budget or the uplink delay budget further comprises:
    monitoring for traffic congestion in the wireless communications between the UE and the base station;
    reporting the traffic congestion to the network core; and
    receiving, from the network core, the modified value of the downlink delay budget or the uplink delay budget in the form of at least one of a modified recommended uplink delay budget or a modified recommended downlink delay budget.

5. The method of claim 2, wherein identifying at least one of the downlink delay budget or the uplink delay budget further comprises:
    determining, based at least in part on the round-trip time latency requirement, an initial uplink delay budget value and an initial downlink delay budget value.

6. The method of claim 5, wherein modifying the value of the downlink delay budget or the uplink delay budget further comprises:
    monitoring for traffic congestion in the wireless communications between the UE and the base station to determine whether the initial uplink delay budget value or the initial downlink delay budget value is satisfied; and
    determining, based at least in part on the traffic congestion, the modified value of the downlink delay budget or the uplink delay budget in the form of at least one of a modified uplink delay budget or a modified downlink delay budget.

7. The method of claim 1, wherein modifying the value of the downlink delay budget or the uplink delay budget further comprises:
    receiving an uplink message from the UE, wherein the uplink message is associated with an uplink latency, and wherein the base station is the wireless communications entity;
    determining, based at least in part on the uplink latency and the round-trip time latency requirement, a time window for transmitting, responsive to the uplink message, a downlink message to the UE; and
    determining a downlink delay budget value that corresponds to the time window, wherein the downlink delay budget value is a modified value of the downlink delay budget.

8. The method of claim 7, further comprising:
    transmitting the downlink message to the UE during the time window and in accordance with the downlink delay budget value, wherein the downlink message is the message that is associated with the modified value of the downlink delay budget.

9. The method of claim 7, wherein determining the time window for transmitting the downlink message to the UE further comprises:
    identifying a first round-trip time for transmissions between the base station and a network core;
    receiving an indication of a second round-trip time for transmissions between the network core and the application server and a processing delay of the application server, or a combination of the second round-trip time and the processing delay;

determining a back-end round-trip time range that is based on the first round-trip time and the indication; and determining the time window based at least in part on the uplink latency, the back-end round-trip time range, and the round-trip time latency requirement.

10. The method of claim 9, wherein determining the time window based at least in part on the uplink latency, the back-end round-trip time range, and the round-trip time latency requirement further comprises:

setting the time window independently for each uplink message received at the base station during the wireless communications.

11. The method of claim 10, wherein setting the time window independently for each uplink message further comprises:

identifying a start time for the time window based at least in part on the uplink latency and a minimum value of the back-end round-trip time range; and identifying an end time for the time window based at least in part on the uplink latency and a maximum value of the back-end round-trip time range.

12. The method of claim 11, wherein determining the downlink delay budget value that corresponds to the time window further comprises:

determining a minimum downlink delay budget value for the time window when multiple time windows for corresponding uplink messages overlap.

13. The method of claim 10, wherein setting the time window independently for each uplink message further comprises:

identifying a start time for the time window based at least in part on the uplink latency and a mean value of the back-end round-trip time range; and identifying an end time for the time window based at least in part on a start time of a next time window, which is based on a next uplink latency for a next uplink message from the UE and a next mean value of a next back-end round-trip time range, wherein the time window and the next time window do not overlap in time.

14. The method of claim 7, wherein determining the time window for transmitting the downlink message to the UE further comprises:

determining the time window for a plurality of uplink messages, wherein the uplink latency used for determining the time window is selected based on an operation that pertains to all of the plurality of uplink messages.

15. The method of claim 7, further comprising:

receiving an indication that the round-trip time latency requirement and at least one of the downlink delay budget or the uplink delay budget pertain to specific traffic flow types.

16. The method of claim 1, wherein the value of the downlink delay budget is modified, and wherein the value of the downlink delay budget that is modified is one of a downlink application data unit delay budget value instead of a downlink packet delay budget value.

17. The method of claim 1, wherein modifying the value of the downlink delay budget or the uplink delay budget further comprises:

receiving a downlink message from the base station, the downlink message associated with a downlink latency, wherein the UE is the wireless communications entity; and determining, based at least in part on the downlink latency and the round-trip time latency requirement, a time window for transmitting, responsive to the downlink message, an uplink message to the base station; and determining an uplink delay budget value that corresponds to the time window, wherein the uplink delay budget value is a modified value of the uplink delay budget.

18. The method of claim 1, wherein modifying the value of the downlink delay budget or the uplink delay budget further comprises:

receiving an uplink message from the UE, the uplink message associated with an uplink latency, wherein the base station is the wireless communications entity;

determining a back-end round-trip time for round-trip communications between the base station and the application server; and determining a downlink delay budget value for a downlink message responsive to the uplink message, wherein the downlink delay budget value is determined based at least in part on the uplink latency and the back-end round-trip time, and wherein the downlink message is the message that is associated with the modified value of the downlink delay budget.

19. The method of claim 18, further comprising:

receiving a time-stamped downlink packet from the application server, the time-stamped downlink packet associated with the downlink message; and determining, a back-end downlink latency based at least in part on a time-stamp of the time-stamped downlink packet and a time at which the time-stamped downlink packet is received at the base station, wherein determining the back-end round-trip time for the round-trip communications between the base station and the application server is based at least in part on the back-end downlink latency.

20. The method of claim 18, wherein determining the back-end round-trip time for the round-trip communications between the base station and the application server further comprises:

forwarding a time-stamped uplink packet to the application server, the time-stamped uplink packet associated with the uplink message;

receiving a time-stamped downlink packet from the application server, wherein a time-stamp on the time-stamped downlink packet is copied from the time-stamped uplink packet; and determining the back-end round-trip time based on the time-stamp and a time at which the time-stamped downlink packet is received at the base station.

21. The method of claim 1, wherein the wireless communications entity is the application server, and wherein the message that is associated with the modified value of the downlink delay budget or the uplink delay budget is transmitted from the application server to a network core and includes indications of a downlink delay budget value and an uplink delay budget value.

22. An apparatus for wireless communication, comprising:

one or more memories storing processor-executable code; and one or more processors coupled with the one or more memories and individually or collectively operable to execute the code to cause the apparatus to:

identify, at a wireless communications entity, a round-trip time latency requirement for an application of an application server that is in communication with a user equipment (UE) via a base station, the round-trip time latency requirement pertaining to round-trip latency in wireless communications between the UE and the base station;

identify, at the wireless communications entity, at least one of a downlink delay budget or an uplink delay budget for the wireless communications between the UE and the base station;

modify a value of the downlink delay budget or the uplink delay budget for the wireless communications between the UE and the base station, wherein a summation of the downlink delay budget and the uplink delay budget satisfies the round-trip time latency requirement based at least in part on the modified value of the downlink delay budget or the uplink delay budget; and transmit a message that is associated with the modified value of the downlink delay budget or the uplink delay budget.

23. The apparatus of claim 22, wherein, to identify the round-trip time latency requirement, the one or more processors are individually or collectively operable to execute the code to cause the apparatus to:

receive the round-trip time latency requirement from either the application server or from a network core that is in communication with the application server.

24. The apparatus of claim 23, wherein, to identify at least one of the downlink delay budget or the uplink delay budget, the one or more processors are individually or collectively operable to execute the code to cause the apparatus to:

receive a recommended uplink delay budget value and a recommended downlink delay budget value from either the application server or from the network core.

25. The apparatus of claim 24, wherein, to modify the value of the downlink delay budget or the uplink delay budget, the one or more processors are individually or collectively operable to execute the code to cause the apparatus to:

monitor for traffic congestion in the wireless communications between the UE and the base station;

report the traffic congestion to the network core; and receive, from the network core, the modified value of the downlink delay budget or the uplink delay budget in the form of at least one of a modified recommended uplink delay budget or a modified recommended downlink delay budget.

26. The apparatus of claim 23, wherein, to identify at least one of the downlink delay budget or the uplink delay budget, the one or more processors are individually or collectively operable to execute the code to cause the apparatus to:

determine, based at least in part on the round-trip time latency requirement, an initial uplink delay budget value and an initial downlink delay budget value.

27. The apparatus of claim 26, wherein, to modify the value of the downlink delay budget or the uplink delay budget, the one or more processors are individually or collectively operable to execute the code to cause the apparatus to:

monitor for traffic congestion in the wireless communications between the UE and the base station to determine whether the initial uplink delay budget value or the initial downlink delay budget value is satisfied; and determine, based at least in part on the traffic congestion, the modified value of the downlink delay budget or the uplink delay budget in the form of at least one of a modified uplink delay budget or a modified downlink delay budget.

28. The apparatus of claim 22, wherein, to modify the value of the downlink delay budget or the uplink delay budget, the one or more processors are individually or collectively operable to execute the code to cause the apparatus to:

receive an uplink message from the UE, the uplink message associated with an uplink latency, wherein the base station is the wireless communications entity;

determine, based at least in part on the uplink latency and the round-trip time latency requirement, a time window for transmitting, responsive to the uplink message, a downlink message to the UE; and determine a downlink delay budget value that corresponds to the time window, wherein the downlink delay budget value is a modified value of the downlink delay budget.

29. An apparatus for wireless communication, comprising:

means for identifying, at a wireless communications entity, a round-trip time latency requirement for an application of an application server that is in communication with a user equipment (UE) via a base station, the round-trip time latency requirement pertaining to round-trip latency in wireless communications between the UE and the base station;

means for identifying, at the wireless communications entity, at least one of a downlink delay budget or an uplink delay budget for the wireless communications between the UE and the base station;

means for modifying a value of the downlink delay budget or the uplink delay budget for the wireless communications between the UE and the base station, wherein a summation of the downlink delay budget and the uplink delay budget satisfies the round-trip time latency requirement based at least in part on the modified value of the downlink delay budget or the uplink delay budget; and means for transmitting a message that is associated with the modified value of the downlink delay budget or the uplink delay budget.

30. A non-transitory computer-readable medium storing code for wireless communication at a wireless communications entity, the code comprising instructions executable by one or more processors to:

identify, at the wireless communications entity, a round-trip time latency requirement for an application of an application server that is in communication with a user equipment (UE) via a base station, the round-trip time latency requirement pertaining to round-trip latency in wireless communications between the UE and the base station;

identify, at the wireless communications entity, at least one of a downlink delay budget or an uplink delay budget for the wireless communications between the UE and the base station;

modify a value of the downlink delay budget or the uplink delay budget for the wireless communications between the UE and the base station, wherein a summation of the downlink delay budget and the uplink delay budget satisfies the round-trip time latency requirement based at least in part on the modified value of the downlink delay budget or the uplink delay budget; and transmit a message that is associated with the modified value of the downlink delay budget or the uplink delay budget.

* * * * *